United States Patent
Robinett et al.

[11] Patent Number: 5,908,122
[45] Date of Patent: Jun. 1, 1999

[54] SWAY CONTROL METHOD AND SYSTEM FOR ROTARY CRANES

[75] Inventors: Rush D. Robinett, Tijeras, N.M.; Gordon G. Parker, Houghton, Mich.; John T. Feddema, Albuquerque, N.M.; Clark R. Dohrmann, Albuquerque, N.M.; Ben J. Petterson, Albuquerque, N.M.

[73] Assignee: Sandia Corporation, Albuquerque, N.M.

[21] Appl. No.: 08/808,821

[22] Filed: Feb. 28, 1997

Related U.S. Application Data

[60] Provisional application No. 60/012,710, Feb. 29, 1996.
[51] Int. Cl.$^6$ .................................................. B66C 13/04
[52] U.S. Cl. .............................. 212/275; 212/225; 901/17
[58] Field of Search .................................. 212/273, 275, 212/225, 226, 227, 228; 901/17

[56] References Cited

U.S. PATENT DOCUMENTS

| | | | |
|---|---|---|---|
| 3,517,830 | 6/1970 | Virkkala et al. | 212/132 |
| 3,921,818 | 11/1975 | Yamagishi et al. | 212/132 |
| 4,512,711 | 4/1985 | Ling et al. | 414/786 |
| 4,603,783 | 8/1986 | Tax et al. | 212/132 |
| 4,717,029 | 1/1988 | Yasunobu et al. | 212/132 |
| 4,756,432 | 7/1988 | Kawashima et al. | 212/132 |
| 4,916,635 | 4/1990 | Singer et al. | 364/513 |
| 4,997,095 | 3/1991 | Jones et al. | 212/147 |
| 5,127,533 | 7/1992 | Virkkunen | 212/147 |
| 5,219,420 | 6/1993 | Kiiski et al. | 212/147 |
| 5,443,566 | 8/1995 | Rushmer et al. | 212/275 |
| 5,823,369 | 10/1998 | Kuromoto | 212/273 |

OTHER PUBLICATIONS

G. R. Elliott, R. J. Fogler, N. Ahmed and D. Hush, *On a Second–Order Adaptive Infinite Impulse Response Filter*, SAND83–2298C, Sandia National Laboratories, Albuquerque, NM (1983).

J. W. Auernig and H. Troger, Time Optimal Control of Overhead Cranes and Hoisting of the Load, Automatica, vol. 23, No. 4, pp. 437–447 (1987).

Kamal A. F. Moustafa and Am M. Ebeid, Nonlinear Modeling and Control of Overhead Crane and Load Sway, Journal of Dynamic Systems, Measurement, and Control, vol. 110, pp. 266–271 (1988).

N. C. Singer, *Residual Vibration Reduction in Computer Controlled Machines*, Technical Report AI–TR 1030, MIT Artificial Intelligence Laboratory, Cabridge, MA (Jan. 1989).

(List continued on next page.)

*Primary Examiner*—Thomas J. Brahan
*Attorney, Agent, or Firm*—V. Gerald Grafe; Andrew Abeyta

[57] ABSTRACT

Methods and apparatuses for reducing the oscillatory motion of rotary crane payloads during operator-commanded or computer-controlled maneuvers. An Input-shaping filter receives input signals from multiple operator input devices and converts them into output signals readable by the crane controller to dampen the payload tangential and radial sway associated with rotation of the jib. The input signals are characterized by a hub rotation trajectory $\gamma(t)$, which includes a jib angular acceleration $\ddot{\gamma}$, a trolley acceleration $\ddot{x}$, and a load-line length velocity $\dot{L}$. The system state variables are characterized by a tangential rotation angle $\theta(t)$ and a radial rotation angle $\phi(t)$ of the load-line. The coupled equations of motion governing the filter are non-linear and configuration-dependent. In one embodiment, a filter is provided between the operator and the crane for filtering undesired frequencies from the angular $\dot{\gamma}$ and trolley $\dot{x}$ velocities to suppress payload oscillation. In another embodiment, crane commands are computer generated and controlled to suppress vibration of the payload using a postulated asymmetrical shape for the acceleration profiles of the jib, which profiles are uniquely determined by a set of parameters (including the acceleration pulse amplitude and the duration and coast time between pulses), or a dynamic programming approach.

30 Claims, 13 Drawing Sheets

OTHER PUBLICATIONS

A. D. Christian, *Design Implementation of a Flexible Robot, Technical Report AI–TR 1153*, MIT Artificial Intelligence Laboratory, Cambridge, MA (Aug. 1989).

Eduardo Bayo, Philip Papadopoulos, James Stubbe, and Miguel Angel Serna, Inverse Dynamics and Kinematics of Multi–Link Elastic Robots: An Iterative Frequency Domain Approach, The International Journal of Robotics Research, vol. 8, No. 6, pp. 49–62 (Dec. 1989).

Farshad Khorrami, Analysis of Multi–link Flexible Manipulators Via Asymptotic Expansions, Proceedings of the $28^{th}$ IEEE Conference on Decision and Control, Tampa, FL, pp. 2089–2094 (Dec. 1989).

Stephen Yurkovich, Anthony P. Tzes, Iewen Lee and Kenneth L. Hillsley, Control and System Identification of a Two–Link Flexible Manipulator, Proceedings of the 1990 IEEE International Conference on Robotics and Automation, Cincinnati, OH, pp. 1626–1631 (May 13–19, 1990).

Brett R. Murphy and Ichiro Watanabe, Digital Shaping Filters for Reducing Machine Vibration, IEEE Transactions on Robotics and Automation, vol. 8, No. 2, pp. 285–289 (Apr. 1991).

John T. Feddema et al, Techniques for Controlling a Two–Link Flexible Arm, Proceedings of the Fourth topical Meeting on Robotics and Remote Systems, Albuquerque, NM (Feb. 24–28, 1991).

M. Fliess, J. Levine, and P. Rouchon, A Simplified Approach of Crane Control Via a Generalized State–Space Model, IEEE Proceedings of the $30^{th}$ Conference on Decision and Control, Brighton, England, pp. 736–741 (1991).

A. M. Ebeid, Mamal A. F. Moustafa, and H. E. Emara–Shabaik, Electromechanical Modelling of Overhead Cranes, International J. Of Systems Science, vol. 23, No. 12, pp. 2155–2169 (1992).

H. T. Nguyen, State–Variable Feedback Controller for an Overhead Crane, Journal of Electrical and Electronics Engineering, Austrailia, vol. 14, No. 2, pp. 75–84 (Jun. 1994).

Sakawa and A. Nakazumi, "Modeling and Control of a Rotary Crane," Jour of Dynamic Systems, Measurement, and Control, vol. 107, pp. 200–206, 1985.

Vaha, S. Pieska and E. Timonen, "Robotization of an Offshore Container Crane," Robots: Coming of Age, Proceedings of the 19th ISIR International Symposium, pp. 637–648, 1988.

Souissi and A.J. Koivo, "Modeling and Control of a Rotary Crane for Swing–Free Transport of Payloads," The First IEEE Conference on Control Applications, Dayton, OH, pp. 782–787, 1992.

Parker, G.G., Petterson, B., Dohrmann, C.R. and Robinett, R.D., "Vibration Suppression of Fixed–Time Jib Crane Maneuvers," Proceedings of the SPIE Smart Structures and Materials Conference, pp. 131–140, 1995.

B.J. Petterson and R.D. Robinett, "Model–Based Damping of Coupled Horizontal and Vertical Oscillations in a Flexible Rod," Journal of Intelligent and Robotic Systems, vol. 4, pp. 285–299, 1991.

G. G. Parker, R. Eisler, and R. D. Robinett, Input Shaping for Vibration–Damped Slewing of a Flexible Beam Using a Heavy–Lift Hydraulic Robot, 1994 American Control Conference, Baltimore, Maryland (1994).

G. G. Parker, Rush D. Robinett, Brian J. Driessen, and Clark R. Dohrmann, "Operator in–the–loop of rotary cranes" Proceedings Reprint from the Smart Structures and Materials, pp. 364–372, 1966.

John T. Feddema, Digital Filter Control of Remotely Operated Flexible Robotic Structures, Proceedings of the American Control Conference, San Francisco, CA (Jun. 1993).

SWAY CONTROL METHOD AND SYSTEM FOR ROTARY CRANES

I. CROSS-REFERENCE TO RELATED APPLICATIONS

This application claims the benefit of U.S. Provisional Application No. 60/012,710, filed Feb. 29, 1996.

II. GOVERNMENT RIGHTS

This invention was made with United States Government support under Contract No. DE-AC04-94AL85000 awarded by the U.S. Department of Energy. The Government has certain rights in this invention.

III. BACKGROUND OF THE INVENTION

The present invention relates generally to the field of cranes. More specifically, the present invention relates to methods of and apparatuses for controlling residual oscillation associated with the movement of suspended payloads of rotary-style cranes.

In general, construction, transportation, and other cranes can be grouped into one of two categories based on their configuration: gantry-style cranes and rotary-style cranes.

The first category is gantry-style crane systems, which incorporate a trolley that translates in a horizontal plane. Attached to the trolley is a load-line for payload attachment. Typically, gantry-style crane systems have varying load-line length capabilities. Gantry-style cranes exhibit a one degree-of-freedom sway (one direction).

The second category is rotary or jib crane systems, for which the load-line attachment point undergoes rotation. A rotary crane includes a pendulum-like end line attached to a rotatable jib. Within this general category of cranes, there exist devices with multiple degrees-of-freedom including variable (adjustable) load-line length and variable jib length. Other degrees-of-freedom may exist such as translation of the load-line attachment point along the jib, or if the jib is replaced by a boom, the characteristic boom rotational motion. Boom rotational motion, referred to as luffing, causes the tip of the boom to move vertically. Conventionally, point-to-point payload maneuvers using jib cranes are performed so as not to excite the spherical pendulum modes (revolute motion) of their cable and payload assemblies. Typically, these spherical pendulum modes, although time-varying, exhibit low frequencies. The first principal motion of the payload resulting from the point-to-point maneuver is a sway tangential to the arc traced by the tip of the jib. The second principal motion of the payload resulting from the point-to-point maneuver is a sway radially from the point of rotation caused by the centripetal acceleration of the payload. At the end of a nominal point-to-point maneuver, the payload oscillates in these two directions. The resulting maneuvers are therefore performed slowly, contributing to high construction and transportation costs.

During crane transport, a payload is free to swing in a spherical pendulum-like motion. If the payload oscillates during crane transportation, then the oscillation must be damped sufficiently by the crane operator or be allowed to decay naturally before the next operation begins. Either option is costly, time consuming, and reduces facility availability. If the crane system can be automated with a programmable computer, however, oscillation of the payload can be eliminated by reacting to the forces created by the spherical pendulum-like motion associated with movement of the payload. In addition, programmability allows movement of suspended objects that are initially at rest without introduction of payload oscillation. Thus, cost, time, facility, and other requirements can be minimized.

Currently, most industrial cranes do not automatically compensate for suspended payload swing at the end of a motion. The crane operator relies on experience to bring the payload to a swing-free stop. Failure of the operator to successfully stop the payload from swinging causes a decrease in operating efficiency. Similarly, a container cannot be safely placed at a stationary position if the payload is moving.

Unfortunately, cranes are used most often in unstructured environments, such as in ship yards and factory floors, where the end position in crane coordinates is not well specified. For example, the desired position of a payload on a ship is not well specified because placement of payloads on ships is not uniform. Therefore, most cranes are guided to their final destination by an operator with the aid of an operator input device, such as a joystick.

Those industrial cranes that automatically compensate for suspended payload swing at the end of a motion typically work only for pre-planned motions where the desired start and end positions of the payload in crane coordinates are well specified. The acceleration and constant velocity times of the motion profiles are planned so that they are a function of the natural period of oscillation $\tau$ of the pendulum-like motion associated with movement of the payload; the period of oscillation $\tau$ is characterized by $$\tau = 2\pi \sqrt{\frac{L}{g}} = \frac{2\pi}{\omega},$$

where g is gravity, L is the cable length, and $\omega$ is the natural frequency of oscillation of the suspended payload.

The field is replete with crane control systems that attempt to eliminate payload swing. Examples of some swing-free crane-related patents are the following:

U.S. Pat. No. 5,443,566, Electronic Antisway Control, of Rushmer et al. depicts a system for the electronic control of the sway of a suspended load from a crane. The natural frequency $\omega_n$ of a simple pendulum is used to estimate the velocity and displacement of the suspended load, and a signal representative of measured load displacement is used to drive the estimated load displacement to the measured load displacement and modify the estimated velocity.

U.S. Pat. No. 5,219,420, Procedure for the Control of a Crane, of Kiiski et al. depicts a method for damping the swing of the load of a crane during a traversing motion of the trolley and/or bridge when the trolley bridge is controlled by a signal that controls the traversing motor. The length of the hoisting rope is determined and used for the calculation of the time of oscillation of the load swing, and when a new speed setting is given, a first control signal compensating the swing prevailing at the moment and a second control signal changing the speed are generated.

U.S. Pat. No. 5,127,533, Method of Damping the Sway of the Load of a Crane, of Virkkunen depicts a system for damping the sway of the load moved by the carriage of the crane, the load being suspended by at least one hoisting rope. The damping is achieved by using a discrete time-domain control system whose control interval is varied in accordance with the hoisting rope length while the control parameters remain constant. The system depicts the use of a transfer function in the formulation of the control and a discrete time-domain control; all transfer functions presented by Virkkunen are formulated using continuous time-domain notation. Virkkunen's system uses fixed-parameter control with a variable control interval. Virkkunen starts with a nominal control interval of 100-ms and modifies the control interval based on the cable length. As depicted in FIG. 3 of Virkkunen, the control method requires a measurement of the carriage position $x_T$, cable sway $\phi$, and cable length L. Equation 2 of Virkkunen is then applied to solve for the reference speed $r_T$.

U.S. Pat. No. 4,997,095, Methods of and System for Swing Damping Movement of Suspended Objects, of Jones et al. (including B. Petterson, co-inventor named in the present application) depicts methods of and system for damping a payload suspended from a gantry-style crane in accordance with a control algorithm based on the periodic motion of the suspended mass or by servoing on the forces induced by the suspended mass.

U.S. Pat. No. 4,916,635, Shaping Command Inputs to Minimize Unwanted Dynamics, of Singer et al. depicts a system where a sequence of impulses is determined which eliminates unwanted dynamics in the dynamic system. The impulse sequence is convolved with an arbitrary command input to drive the dynamic system to an output with a minimum of unwanted dynamics. The input signal is processed to counteract the effects of unwanted dynamics such as payload swing.

U.S. Pat. No. 4,756,432, Crane Control Method, of Kawashima et al. depicts a crane control method where a payload is moved at a predetermined velocity to a predetermined point by computer control to minimize swinging. Their invention is directed toward a two-pulse method in which mid-course constant velocity is somehow controlled. The control is performed in an accelerating period, a constant velocity travel, and a decelerating period separately, wherein the control is performed during the accelerating and decelerating periods by turning on and off predetermined accelerating and decelerating forces.

U.S. Pat. No. 4,717,029, Crane Control Method, of Yasunobu et al. depicts a method in which a payload suspended by a rope is laterally transported by a trolley, the accelerating and decelerating time of the trolley are obtained on the basis of the mass of the trolley, the mass of the suspended payload, and the rope length. During the constant speed running, the stop position of the trolley is predicted on the basis of the decelerating time.

U.S. Pat. No. 4,603,783, Device on Hoisting Machinery for Automatic Control of the Movement of the Load Carrier, of Tax et al. depicts an automatic control system for controlling the movement of a load and for steadying the associated pendulum-like motion of the load. The system includes a signal transmitter for sending signals for controlling the movement of a load carrier traction motor.

U.S. Pat. No. 4,512,711, Unloading of Goods, Such as Bulk Goods from a Driven, Suspended Load-Carrier, of Ling et al. depicts a method for controlling the lateral displacement of a trolley supporting goods to be unloaded at a certain location. A pendulum is held at a constant angle while the system decelerates to a stop and then accelerates in an opposite direction. The Ling et al. invention does not teach a continuum of solutions and does not use a coupled and nonlinear model.

U.S. Pat. No. 3,921,818, Crane Suspension Control Apparatus, of Yamagishi depicts a system where a crane is accelerated and decelerated with two pulses, the second pulse being timed to counteract the swing of the payload.

U.S. Pat. No. 3,517,830, Cranes, of Virkkala depicts an arrangement for reducing the oscillations of the pendulum-like motion associated with movement of the load. A moving mechanism is provided with a synchronizing device, automatically functioning so that each change of acceleration is automatically succeeded by another equally great and similarly directed change of acceleration after a time, which is half the length of the period of oscillation of the load.

In recent years, many researchers have worked on the control of flexible structures, such as cranes. To date, a general solution to the controls problem has yet to be realized. One very important reason for this is that computationally-efficient mathematical methods do not exist for solving the extremely complex sets of partial differential equations and the associated boundary conditions that most accurately model gantry-style structures. While general solutions do not exist, some interesting solutions do exist for simplified cases. (See, for example, N. C. Singer, Residual Vibration Reduction in Computer Controlled Machines, Technical Report Al-TR 1030, MIT Artificial Intelligence Laboratory, Cambridge, Mass., (January 1989); A. D. Christian, Design and Implementation of a Flexible Robot, Technical Report Al-TR 1153, MIT Artificial Intelligence Laboratory, Cambridge, Mass. (August 1989); Stephen Yurkovich, Anthony P. Tzes, Iewen Lee, and Kenneth L. Hillsley, Control,and System Identification of a Two-Link Flexible Manipulator, Proceedings of the 1990 IEEE International Conference on Robotics and Automation, Cincinnati, Ohio, pp. 1626–1631, (May 13–19, 1990); Brett R. Murphy and Ichiro Watanabe, Digital Shaping Filters for Reducing Machine Vibration, IEEE Transactions on Robotics and Automation, vol. 8, no. 2, pp. 285–289 (April 1992); Farshad Khorrami, Analysis of Multi-link Flexible Manipulators Via Asymptotic Expansions, Proceedings of the 28th IEEE Conference on Decision and Control, Tampa, Fla., pp. 2089–2094 (December 1989); and Eduardo Bayo, Philip Papadopoulos, James Stubbe, and Miguel Angel Serna, Inverse Dynamics and Kinematics of Multi-Link Elastic Robots: An Iterative Frequency Domain Approach, The International Journal of Robotics Research, Vol. 8, No. 6, pp. 49–62 (December 1989).).

A simple input-shaping filter that modifies the reference input so that the residual vibrations of Linear Time Invariant ("LTI") systems are eliminated was taught in N. C. Singer, Residual Vibration Reduction in Computer Controlled Machines, Technical Report Al-TR 1030, MIT Artificial Intelligence Laboratory, Cambridge, Mass., (January 1989). N. C. Singer's method involves convolving an input signal with a train of impulses that are calculated based on perfect knowledge of the crane system's flexible mode parameters. When these impulses are convolved with an arbitrary input, the crane system follows the input without vibration and with a time delay approximately equal to the length of the impulse train (typically equal to the period of vibration). This simplification has proven to provide reasonable response when applied to a three-degree-of-freedom flexible robot arm [A. D. Christian, Design and Implementation of a Flexible Robot, Technical Report Al-TR 1153, MIT Artificial Intelligence Laboratory, Cambridge, Mass. (August 1989)]. B. R. Murphy and I. Watanabe later extended Singer's work by applying digital theory to the design of the input-shaping filter. [Brett R. Murphy and Ichiro Watanabe, Digital Shaping Filters for Reducing Machine Vibration, IEEE Transactions on Robotics and Automation, vol. 8, no. 2, pp. 285–289 (April 1992); see also J. T. Feddema et al., Methods for Controlling a Two-Link Flexible Arm, Proceedings of the Fourth Topical Meeting on Robotics and Remote Systems, Albuquerque, N.Mex. (February 24–28, 1991)].

Auernig and Troger consider time optimal payload maneuvers of a gantry-style crane undergoing trolley translation and load-line length change. [J. W. Auernig and H. Troger, Time Optimal Control of Overhead Cranes with Hoisting of the Load, Automatica, vol. 23, no. 4, pp. 437–447 (1987).] The coupled, nonlinear equations of motion and adjoint equations, obtained from the application of Pontryagin's maximum principle, are solved analytically for the cases of constant and variable hoisting speeds. In both cases, the maneuvers are developed such that the payload is residual oscillation free. Moustafa and Ebeid demonstrate a state-feedback controller for damping load sway for a gantry-style crane configured to move along two orthogonal directions in the horizontal plane. [Kamal A. F. Moustafa and A. M. Ebeid, Nonlinear Modeling and Control of Overhead Crane Load Sway, Journal of Dynamic Systems, Measurement, and Control, vol. 110, pp. 266–271 (1988).] This work is expanded on by Ebeid et al. to incorporate actuator dynamics into the crane model. [A. M. Ebeid, Kamal A. F. Moustafa, and H. E. Emara-Shabaik, Electromechanical Modeling of Overhead Cranes, International J. of Systems Science, Vol. 23, No. 12, pp. 2155–2169 (1992).] Fliess et al. investigate a feedback linearizing controller for a one-dimensional gantry-style crane. [M. Fliess, J. Levine, and P. Rouchon, A Simplified Approach of Crane Control Via a Generalized State-Space Model, IEEE Proceedings of the 30th Conference on Decision and Control, Brighton, England, pp. 736–741 (1991).] Trolley traversal and load-line length changes are considered. Simulation results indicate the ability of the closed-loop controller to control load sway for relatively-slow maneuvers. Nguyen examines this same system where simulation and experimental results of a nonlinear state-feedback controller are used. [H. T. Nguyen, State-Variable Feedback Controller for an Overhead Crane, Journal of Electrical and Electronics Engineering, Australia, Vol. 14, No. 2, pp. 75–84 (June 1994).] Small motions are assumed about a specified operating point, which allows for decoupled equations of motion and decoupled controller design.

Sakawa and Nakazumi [Y. Sakawa and A. Nakazumi, Modeling and Control of a Rotary Crane, Journal of Dynamic Systems, Measurement, and Control, vol. 107, pp. 200–206 (1988).] investigate a rotary crane undergoing hub and boom rotation and load hoisting using a combined open and closed-loop approach. The open-loop input to the crane is designed based on a postulated set of functions such that the sway motion of the load is excited minimally. The closed-loop controller is then switched on when the maneuver is near the end, providing significant sway damping. Vaha et al. generate suboptimal, minimum time inputs for a rotary crane [P. Vaha, S. Pieska, and E. Timonen, Robotization of an Offshore Container Crane, Robots: Coming of Age, Proceedings of the 19th ISIR (International Symposium and Exposition on Robots), pp. 637–648 (1988).]. Tracking is achieved via a state feedback control law. Radial sway due to centripetal acceleration of the payload, however, is not compensated. Souissi and Koivo [R. Souissi and A. J. Koivo, Modeling and Control of a Rotary Crane for Swing-Free Transport of Payloads, The First IEEE Conference on Control Applications, Dayton, Ohio, pp. 782–787 (1992).] consider a rotary crane undergoing a boom-rotation-boom maneuver using a proportional-integral-derivative controller similar to Fliess et al. [M. Fliess, J. Levine, and P. Rouchon, A Simplified Approach of Crane Control Via a Generalized State-Space Model, IEEE Proceedings of the 30th Conference on Decision and Control, Brighton, England, pp. 736–741 (1991).]. The simulation model considers both radial and tangential payload sway, however, the control strategy used results in residual load oscillation.

Despite the prodigious amount of swing-free crane systems of which these references are representative, a practical system that is capable of significantly eliminating payload swing for a rotary-style crane has not been realized until the present invention. The swing-free operator control system and method described herein controls residual oscillation of suspended payloads on a rotary-style crane, which exhibit multiple degrees-of-freedom sway. (Gantry-style cranes exhibit a one degree-of-freedom sway (one direction).) While most operators are very experienced in crane maneuvers, an appropriately-designed controller as in the present invention allows even an inexperienced operator to perform swing-free motions using an operator input or speed control device, such as a button box or a joystick.

IV. BRIEF SUMMARY OF THE INVENTION

The present invention comprises a method of and system for filtering crane input signals such that payload sway is damped, the rotary crane having a rotary jib, the rotary jib being rotatable in the horizontal plane, a trolley attached to the rotary jib, the trolley being moveable in a horizontal plane and being controlled by a crane controller, a payload suspended by a variable-length load-line from the trolley, the payload being moveable in the horizontal and a vertical plane by an operator via at least one operator input device, the payload experiencing a sway characterized by a tangential rotation angle $\theta(t)$ with respect to the load-line and a radial rotation angle $\phi(t)$ with respect to the load-line, the system being characterized by multiple oscillatory degrees of freedom for the radial rotation angle and the tangential rotation angle, the system having input signal receiving means for receiving input signals from the operator input device, the input signals having a jib angular velocity $\dot{\gamma}$ and a trolley velocity $\dot{x}$; input-shaping filter means for converting the input signals into output signals readable by the crane controller, the output signals having a filtered jib angular velocity $\dot{\gamma}_F$ and a filtered trolley velocity $\dot{x}_F$ such that the tangential rotation angle $\theta(t)$ and the radial rotation angle $\phi(t)$ approach zero; and output signal transmitting means for transmitting the output signals to the crane controller to dampen the payload sway associated with movement of the rotary jib. The multiple oscillatory degrees of freedom for the radial rotation angle $\phi$ and the tangential rotation angle $\theta$ are determined by a matrix of nonlinear and coupled equations of motion, the matrix being a function of the load-line length L, gravity g, trolley position x, the jib rotation angle $\gamma$, the radial rotation angle $\phi$, and the tangential rotation angle $\theta$.

The filtering method comprises the steps of representing the dynamics of the rotary crane with a matrix of nonlinear and coupled equations of motion, the matrix being a function of the load-line length L, gravity g, trolley position x, the jib rotation angle $\gamma$, the radial rotation angle $\phi$, and the tangential rotation angle $\theta$; implementing command-shaping filters based on the matrix; receiving input signals from at least one operator input device; filtering the input signals to produce filtered input signals; transmitting the filtered input signals to the crane controller such that payload sway associated with movement of the rotary jib is dampened. The filtering method further comprises the steps of linearizing the matrix with respect to the radial rotation angle $\phi$ and the tangential rotation angle $\theta$; transforming the linearized matrix to modal coordinates; designing and implementing command-shaping filters; transforming the command-shaping filters to a physical coordinate system to obtain filtered inputs; and providing the filtered input signals to the crane controller.

In an alternate embodiment, a computer-implemented system is presented for generating rotary-crane maneuvers such that payload sway is damped, the rotary crane having a rotary jib, the rotary jib being rotatable in the horizontal plane, a trolley attached to the rotary jib, the trolley being moveable in a horizontal plane and being controlled by a crane controller, a payload suspended by a variable-length load-line from the trolley, the payload being moveable in the horizontal and a vertical plane by commands from the computer-implemented system, the payload experiencing a sway characterized by a tangential rotation angle θ(t) with respect to the load-line and a radial rotation angle φ(t) with respect to the load-line, the system being characterized by multiple oscillatory degrees of freedom for the radial rotation angle and the tangential rotation angle, the system comprising maneuver generation means for providing input signals readable by the crane controller, the input signals being characterized by predetermined initial and final positions of the payload, the initial positions being a function of a trolley position x, a jib rotation angle γ, and a load-line length L; and output signal transmitting means for transmitting the output signals to the crane controller to control a series of predetermined paths of the payload in such a way that sway associated with movement of the rotary jib is damped. The multiple oscillatory degrees of freedom for the radial rotation angle φ and the tangential rotation angle θ are determined by a matrix of nonlinear and coupled equations of motion, and the matrix is a function of the load-line length L, gravity g, trolley position x, the jib rotation angle γ, the radial rotation angle φ, and the tangential rotation angle θ. This alternate embodiment generates a jib angular acceleration profile, a trolley acceleration profile, and a load-line velocity profile. These profiles are then optimized by applying either a postulated asymmetrical pulse profile, or by using dynamic programming.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

V. BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

VI. DETAILED DESCRIPTION OF THE INVENTION

The following detailed description of the invention includes a description of a rotary crane that is of interest, a derivation of the equations of motion that represent the dynamics of the multiple degree-of-freedom rotary crane, and a presentation of at least three different embodiments based on the equations of motion. The first embodiment presented includes a filter between the operator and the crane to accomplish movement of the payload by the operator without sway, and the second and third embodiments include computer-controlled (no operator) maneuver generators to accomplish predetermined movements of the payload by the computer without sway. The rotary crane illustrated in FIG. 1, along with the derived equations of motion, are applicable to all embodiments.

Figure 1:
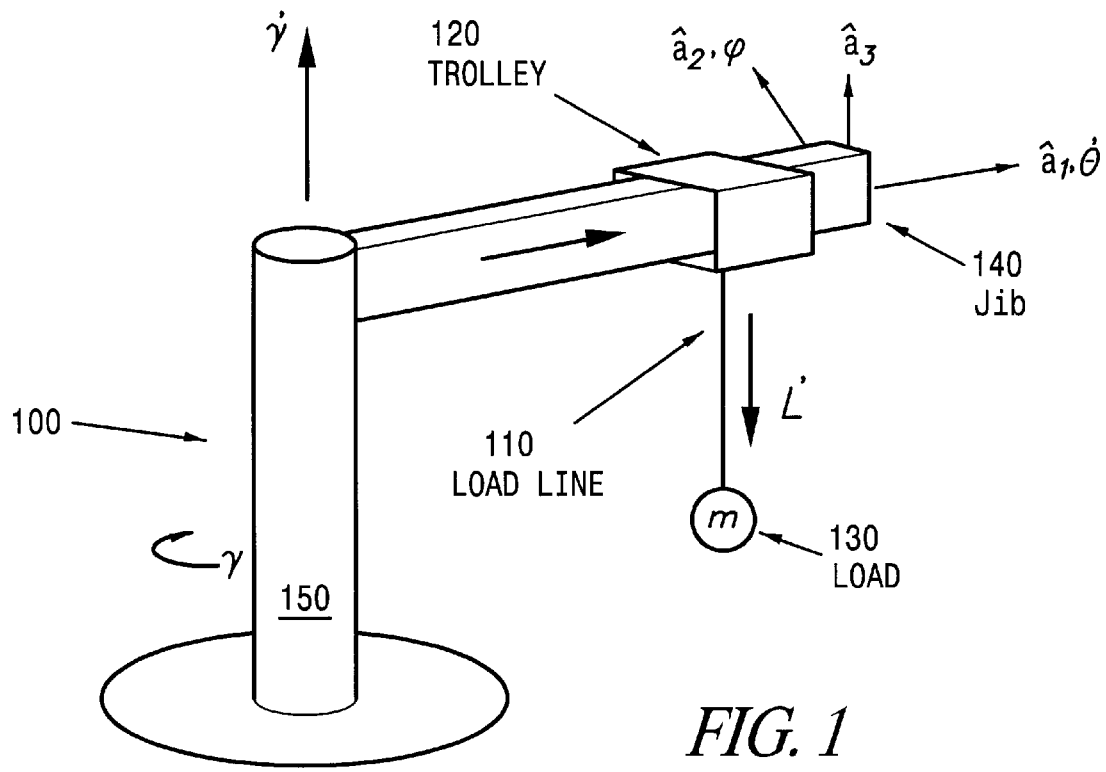
FIG. 1 is a rotary crane model in accordance with the present invention.

Referring to FIG. 1, a rotary crane 100 includes a multiple degree-of-freedom platform for positioning a spherical-pendulum mode payload 130. Frequently, pendulum modes are time-varying and exhibit low natural frequencies. Maneuvers are therefore performed at rates sufficiently slow so as not to excite oscillation.

Rotary crane 100 includes a translating load-line 110, having length L, and payload assembly 130 (represented by mass m) attached to a moving or translating trolley 120, which travels along a jib 140. Trolley 120 can translate along jib 140, while jib 140 can rotate in the horizontal plane along jib rotation angle γ. A crane operator or a computer positions payload 130 by issuing a plurality of commands, as well as changes in load-line length L, either through at least one operator input device 45 or the computer to the platform. Payload 130 (shown as a two degree-of-freedom spherical pendulum with mass m) is attached to one end of rigid jib 140. The other end of jib 140 is attached to a direct drive motor (not shown) for generating rotational motion. The attachment point of load-line 110 to jib 140 is at a distance x(t) from the center of rotation of hub 150. Load-line 110 has variable length L(t), and payload 130 has mass m. The crane configuration is characterized by one rotational axis (jib 140) and two translational axes (position x of trolley 120 (directed along jib 140) and variable length L of load-line 110). There are three controlled motions for rotary crane 100: jib rotation (γ), trolley translation (x), and variable load-line length (L).

Referring again to FIG. 1, the $\hat{a}_1, \hat{a}_2, \hat{a}_3$ coordinate system is assigned to jib 140, which rotates about hub 150 in the horizontal plane with angular rate $\dot{\gamma}(t)$. Rotation of jib 140 causes the payload 130 to oscillate in a sway radial from the point of rotation (due to centripetal acceleration of payload 130) and a sway tangential to the arc traced by the tip of jib 140 (due to tangential acceleration). The system state variables are characterized by a tangential rotation angle θ(t) and a radial rotation angle φ(t) of the load-line. The rotation angles θ(t) and φ(t) are defined as rotations of the load-line 110 about the $\hat{a}_1$ and $\hat{a}_2$ axes, respectively as shown in FIG. 1. The two payload sway rotations will from now on be referred to as the radial (φ) and the tangential (θ) rotation.

A. EQUATIONS OF MOTION

The equations of motion for the oscillatory degrees of freedom that represent the dynamics of rotary crane 100 are described as follows with the aid of FIG. 1. The crane system of FIG. 1 has three controlled motions: the jib rotation, the trolley translation, and the load-line length.

Using the rotating $\hat{a}_1, \hat{a}_2, \hat{a}_3$ coordinate system of FIG. 1, the vector from the center of rotation of hub 150 to payload 130 is:

$$\underline{p}(t) = (x(t) - L(t)\cos[\theta(t)]\sin[\phi(t)])\hat{a}_1 + L(t)\sin[\theta(t)]\hat{a}_2 - L(t)\cos[\theta(t)]\cos[\phi(t)]\hat{a}_3. \qquad \text{Eq. 1}$$

Lagrange's equations (Eq. (2)) are applied to this system $$\frac{d}{dt}\left(\frac{\partial Lag}{\partial \dot{q}_i}\right) - \frac{\partial Lag}{\partial q_i} = 0 \qquad \text{Eq. 2}$$

with $q_1 = \theta$ and $q_2 = \phi$, where the Lagrangian Lag is the difference between the kinetic energy T and the potential energy V.

$$Lag = T - V \qquad \text{Eq. 3}$$

With the aid of FIG. 1 and Eq. 1, the kinetic energy T can be determined by:

$$T = \tfrac{1}{2} m \dot{\underline{p}}^T \dot{\underline{p}} \qquad \text{Eq. 4}$$

$$\dot{\underline{p}} = [\dot{x} - \dot{L}\cos\theta\sin\phi + L\dot{\theta}\sin\phi\sin\theta - L\dot{\phi}\cos\theta\cos\phi - L\dot{\gamma}\sin\theta]\hat{a}_1 + \qquad \text{Eq. 5}$$
$$[\dot{L}\sin\theta + L\dot{\theta}\cos\theta + \dot{\gamma}(x - L\cos\theta\sin\phi)]\hat{a}_2 +$$
$$[-\dot{L}\cos\theta\cos\phi + L\dot{\theta}\sin\theta\cos\phi + L\dot{\phi}\cos\theta\sin\phi]\hat{a}_3.$$

where $\dot{\underline{p}}$ is the absolute velocity of payload 130 (with mass m) in the rotating coordinate frame.

With the aid of FIG. 1 and Eq. 1, the potential energy V can also be determined by:

$$V = -mgL\cos\phi\cos\theta \qquad \text{Eq. 6}$$

where m is mass, g is gravity, L is load-line length, φ is the radial rotation, and θ is the tangential rotation.

Substituting Eq. 3 through Eq. 6 into Eq. 2 yields the linearized equations of motion (Eq. 7) for the radial (φ) and the tangential (θ) oscillatory degrees of freedom:

$$\begin{bmatrix}\ddot{\phi}\\\ddot{\theta}\end{bmatrix}+2\begin{bmatrix}\frac{\dot{L}}{L} & \dot{\gamma}\\-\dot{\gamma} & \frac{\dot{L}}{L}\end{bmatrix}\begin{bmatrix}\dot{\phi}\\\dot{\theta}\end{bmatrix}+\begin{bmatrix}\left(\frac{g}{L}-\dot{\gamma}^2\right) & \left(\ddot{\gamma}+2\dot{\gamma}\frac{\dot{L}}{L}\right)\\-\left(\ddot{\gamma}+2\dot{\gamma}\frac{\dot{L}}{L}\right) & \left(\frac{g}{L}-\dot{\gamma}^2\right)\end{bmatrix}\begin{bmatrix}\phi\\\theta\end{bmatrix}=$$
$$\frac{1}{L}\begin{bmatrix}\ddot{x}-\dot{\gamma}^2 x\\-\ddot{\gamma}x-2\dot{x}\dot{\gamma}\end{bmatrix}$$
Eq. 7 where small angle assumptions have been exploited for $\phi$ and $\theta$ and derivatives thereof. The multiple degree of freedom rotary crane system results in the nonlinear coupled matrix form of Eq. 7 to handle the cross coupling between the trolley and rotation angle parameters; more than one degree of freedom needs to be addressed for filter 50 or maneuver generator 55 presented herein. $\theta$ is the tangential sway angle of payload 130, $\phi$ is the radial sway angle of payload 130, L is the length of load-line 110, $\gamma$ is the jib rotation angle, and x is the position of trolley 120 along jib 140. Note that the quantities x, $\gamma$, and L are functions of time, resulting in a time-varying stiffness effect. Detailed discussion of this phenomenon for related but different systems is discussed by Petterson and Robinett [B. J. Petterson and R. D. Robinett, Model-Based Damping of Coupled Horizontal and Vertical Oscillations in a Flexible Rod, Journal of Intelligent and Robotic Systems, vol. 4, pp. 285–299 (1991).] and is incorporated herein by reference.

Figure 1A:
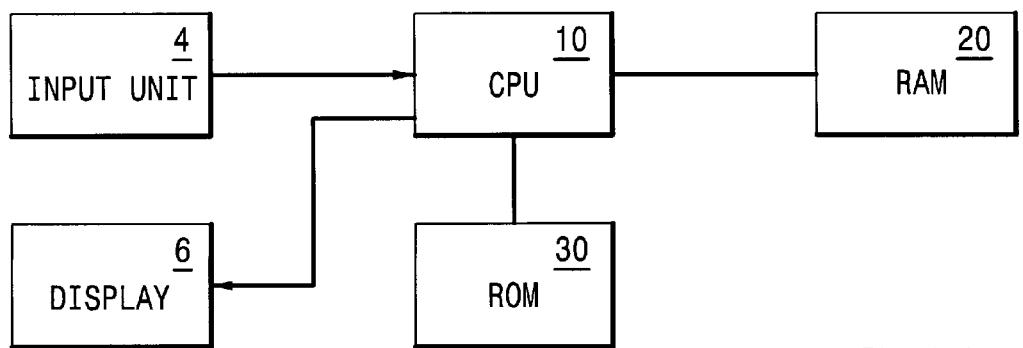
FIG. 1A is a block diagram of the computer apparatus used to implement the filter and maneuver generator in accordance with the present invention.

FIG. 1A illustrates a central processing unit ("CPU") 10 connected to a random access memory ("RAM") 20, which is preferably Static RAM ("SRAM") with a battery back-up, and a read-only memory ("ROM") 30 for implementing the various equations and constraints associated with the present invention. An input unit 4 (e.g., keypad) is connected to CPU 10 for inputting crane system data into a data base stored in battery-backed-up SRAM 20. Input unit 4 can be a conventional digital computer input for entering data into the data base by, for example, directly entering the data into a data file via a keyboard, keypad, mouse, digitizer, light pen, or similar input device. The data entered via input unit 4 can include any physical characteristic data of the crane system 100 such as load-line length L; boom length; trolley position x; angular velocity, angular acceleration, trolley acceleration, which can be parameterized by pulse magnitude, pulse duration, and coast duration; deadband voltage (joystick input signal is considered zero within deadband, with or without filtering); joystick input signals; payload mass m; etc.

The foregoing examples of crane data initialization parameters can be stored for easy retrieval in static RAM 20. In addition, display means 6 is connected to the CPU 10 for displaying the crane system data and output. A conventional display means 6, such as a cathode ray tube ("CRT") or Liquid Crystal Display ("LCD") for example, can be used. The digital computer is also configured to include an analog-to-digital (A/D) interface for filter 50 for converting analog input signals from input device 45 to digital format. The digital computer is also configured to include a digital-to-analog (D/A) interface for sending the output signals in analog format to conventional crane controller 40. The design choice, assembly, and use of the aforementioned components are considered to be well within the abilities of one of ordinary skill in the art and thus, will not be discussed herein except in regard to the examples presented for illustration purposes.

B. FIRST EMBODIMENT

In this first embodiment (with operator-in-the-loop control), a method and apparatus is presented using (adaptive) configuration-dependent input-shaping filters, the residual oscillations of payload 130 are significantly reduced for general, simultaneous three-axis maneuvers (jib angular velocity $\dot{\gamma}$, trolley velocity $\dot{x}$, and load-line length velocity $\dot{L}$). Exemplary test results are presented below for the first embodiment where the nonlinear sway dynamics are simulated in real-time using a digital signal processing (DSP) board. The three-axis commands (jib angular velocity $\dot{\gamma}$, trolley velocity $\dot{x}$, and load-line length velocity $\dot{L}$) are supplied by an operator via input devices, such as two analog joysticks.

The first embodiment of the present invention applies input shaping as described by Feddema [J. T. Feddema, Digital Filter Control of Remotely Operated Flexible Robotic Structures, Proceedings of the 1993 American Control Conference, San Francisco, Calif. (June 1993).] to the nonlinear sway dynamics of rotary crane 100 for the first time. The present invention includes a set of adaptive input-shaping filters 50 that are able to update trolley position x and load-line length L in real-time, which values for x and L are provided by hardware on the crane system. Trolley position x and load-line length L are measured, but not modified, by measuring devices such as commercially-available encoders. The inputs to this system are the output of the crane's velocity tracking servo controllers at each axis (not shown). The servo controllers of crane 5 are assumed to be closed-loop.

Figure 1B:
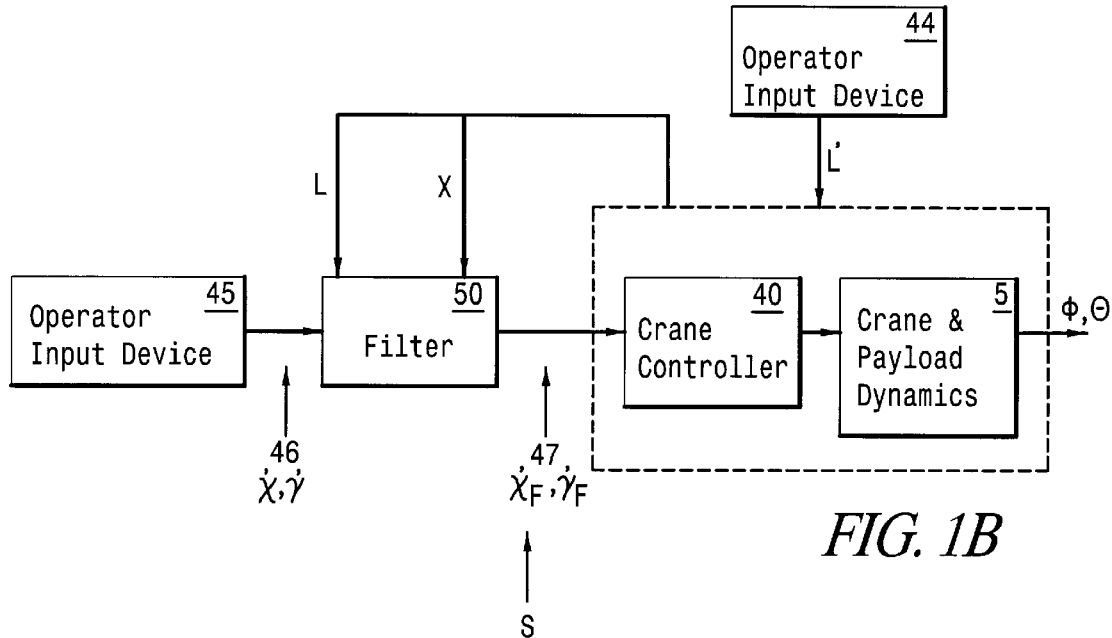
FIG. 1B is a block diagram of an open-loop model of the overall crane control system including an adaptive input-shaping filter in accordance with the first embodiment of the present invention.

Referring to FIG. 1B, the various components or subassemblies of the system S now will be described in detail. Input-shaping filter 50 (discrete or continuous time-domain) is used to filter out unwanted frequencies experienced by rotary-style crane 5 (crane and payload dynamics) to accomplish a residual oscillation-free maneuver, which is operator controlled (operator-in-the-loop), based on the governing equations of motion and the various filter embodiments presented herein. In practice, filter 50 can be implemented by programming a general purpose digital computer (as described above with reference to FIG. 1A) positioned between operator input device 45 and crane controller 40; it can be implemented as an embedded, programmed, digital computer between operator input device 45 and crane controller 40. The system and method of the present invention is adapted to run on a general purpose digital computer that is programmed with the equations described herein. However, filter 50 can also be implemented in hardware (e.g., electronic circuit) and such implementation is intended to be covered by the claims of the present invention. Several embodiments of filter 50 are presented hereinafter.

Referring again to FIG. 1B, a conventional crane controller 40 for rotarystyle crane 5 is shown with at least one operator control/input device 45 that provides input signals 46 (e.g., electrical control signals from a single or multiple operator's joystick controlling position, velocity, or acceleration) to conventional crane controller 40 to control motors (not shown) on rotary crane 5 to move payload 130 (shown in FIG. 1). As shown in FIG. 1B, the present invention comprises filter 50 positioned between operator input device 45 and crane controller 40 for reducing payload sway in rotary crane 5. The present invention alters input signals 46 and converts them to output signals 47 in such a way to control residual radial ($\phi$) and tangential ($\theta$) sway. Filter 50 receives input signals 46 from operator input device 45 and converts them into (filtered) output signals 47 to be transmitted to and received by crane controller 40 to prevent sway in payload 130.

The inputs to crane controller 40 are the hub rotation trajectory $\gamma(t)$: jib angular velocity $\dot{\gamma}$, trolley velocity $\dot{x}$, and load-line length velocity $\dot{L}$. Input signals 46 of filter 50 are jib angular velocity $\dot{\gamma}$ and trolley velocity $\dot{x}$. Output signals 47 of filter 50 are filtered trolley velocity $\dot{x}_F$ and filtered angular velocity $\dot{\gamma}_F$ (according to an integration of Eq. 24 below to obtain the velocities), which become the input signals 47 to crane controller 40 as shown in FIG. 1B. Load-line length velocity $\dot{L}$ is input to the crane controller 40, typically, via a second operator input device 44 as shown in FIG. 1B. The outputs of crane 5 are the rotation angles $\theta(t)$ and $\phi(t)$ of load-line 110.

Because of the nature of the resulting filter 50, it could be easily implemented with a single digital signal processing ("DSP") microchip in a manner well known to those of ordinary skill in the art, thus reducing the cost of implementation. The configuration described herein makes input-shaping filter 50 described herein especially suitable as an after market add on; it allows an existing crane controller 40 to remain intact. Filter 50 can be added to existing or new cranes with minimal expense.

1. Filter Design For First Embodiment

In the first embodiment, the method for designing forward path command filters for jib angular velocity (rotation) $\dot{\gamma}$ and trolley velocity (translation) $\dot{x}$ is described as follows. Using a simplified model of Eq. 7, the system is transformed to modal coordinates. Decoupled forward path filters for both jib angular velocity $\dot{\gamma}$ and trolley velocity $\dot{x}$ are designed in the modal coordinate system with configuration-dependent, imaginary coefficients. After transforming back to the physical coordinates, the filters between jib angular velocity $\dot{\gamma}$ and trolley velocity $\dot{x}$ become coupled, with configuration-dependent, real coefficients.

To simplify the equations of motion model of Eq. 7 further, it is assumed that jib angular velocity $\dot{\gamma}$, trolley velocity $\dot{x}$, and load-line length velocity $\dot{L}$ are of the same order of magnitude as $\dot{\theta}$ and $\dot{\phi}$. The resulting simplified equations of motion (decoupled in payload rotations) model is obtained by retaining terms of order less than two:

$$\begin{bmatrix} \ddot{\phi} \\ \ddot{\theta} \end{bmatrix} + \begin{bmatrix} \frac{g}{L} & \dot{\gamma} \\ -\dot{\gamma} & \frac{g}{L} \end{bmatrix} \begin{bmatrix} \phi \\ \theta \end{bmatrix} = \frac{1}{L} \begin{bmatrix} \ddot{x} \\ -x\ddot{\gamma} \end{bmatrix} \qquad \text{Eq. 8}$$

This system in Eq. 8 can be represented symbolically as:

$$M\underline{\ddot{\Phi}} + K\underline{\Phi} = \underline{u} \qquad \text{Eq. 9}$$

where the matrix M is a 2×2 identity matrix, K is a 2×2 matrix chosen appropriately from Eq. 8, and $\underline{u}$ is a 2×1 vector of the terms on the right side of Eq. 8. Eigenvalues and eigenvectors are found by solving Eq. 10:

$$(K - \omega_i^2 M)\underline{e}_i = 0 \qquad \text{Eq. 10}$$

yielding:

$$\omega_{1,2}^2 = g/L \pm \dot{\gamma} i \qquad \text{Eq. 11}$$

and:

$$E = [\underline{e}_1 \ \underline{e}_2] = \begin{bmatrix} 1 & i \\ i & 1 \end{bmatrix} \qquad \text{Eq. 12}$$

where i is the square root of −1. The system of Eq. 9 can be transformed to:

$$I\underline{\ddot{y}} + \Omega Q \underline{y} = \underline{U} \qquad \text{Eq. 13}$$

where $$\Phi = E \begin{bmatrix} y_1 \\ y_2 \end{bmatrix} = E\underline{y} \quad \begin{bmatrix} U_1 \\ U_2 \end{bmatrix} = \underline{U} = E^{-1}\underline{u} \text{ and} \qquad \text{Eq. 14}$$

$$\Omega = E^{-1}KE = \begin{bmatrix} \frac{g}{L} + i\dot{\gamma} & 0 \\ 0 & \frac{g}{L} - i\dot{\gamma} \end{bmatrix} \qquad \text{Eq. 15}$$

Now, the forward path filters are designed in the modal coordinate space after representing the decoupled system of Eq. 13 in the Laplace domain:

$$\frac{y_1}{U_1} = \frac{1}{s^2 + \left(\frac{g}{L} + i\dot{\gamma}\right)} \quad \frac{y_2}{U_2} = \frac{1}{s^2 + \left(\frac{g}{L} - i\dot{\gamma}\right)} \qquad \text{Eq. 16}$$

requiring that jib angular acceleration $\ddot{\gamma}$ and load-line length $L$ are constant (as measured by encoders) over each finite length sample period. The filtered inputs to crane controller 40, designated as $\underline{U}_F$ are:

$$\underline{U}_F = B\underline{U} \qquad \text{Eq. 17}$$

where the 2×2 matrix B is:

$$B = \begin{bmatrix} \dfrac{K_1\left[s^2 + \left(\frac{g}{L} + i\dot{\gamma}\right)\right]}{(s+a_1)^3} & 0 \\ 0 & \dfrac{K_2\left[s^2 + \left(\frac{g}{L} - i\dot{\gamma}\right)\right]}{(s+a_2)^3} \end{bmatrix} \qquad \text{Eq. 18}$$

where:

$$K_1 = \frac{a_1^3}{\frac{g}{L} + i\dot{\gamma}} \quad K_2 = \frac{a_2^3}{\frac{g}{L} - i\dot{\gamma}} \qquad \text{Eq. 19}$$

are chosen to yield unity steady-state system gain of the filtered inputs in a manner well known to those skilled in the art. These transfer functions in B approximate configuration-dependent notch filters (wherein only certain frequencies are passed and exhibit 0-dB at the notch), where the design parameters $a_1$ and $a_2$ determine the amount of roll-off after the notch.

The filtered inputs in physical coordinates are then (Eq. 20 represents the coupled filter.):

$$\underline{u}_F = E\underline{U}_F = EB\underline{U} = EBE^{-1}\underline{u} \qquad \text{Eq. 20}$$

$$\underline{u}_F = \frac{1}{2}\begin{bmatrix} B_{11} + B_{22} & i(B_{22} - B_{11}) \\ -i(B_{22} - B_{11}) & B_{11} + B_{22} \end{bmatrix}\underline{u}$$

The expressions for $B_{11}+B_{22}$ and $B_{11}-B_{22}$ are greatly simplified by enforcing an exemplary design constraint of $a=a_1=a_2$ resulting in an explicit representation of Eq. 20 as:

$$u_F = \begin{bmatrix} \dfrac{a^3\beta\left(s^2 + \dfrac{1}{\beta}\right)}{(s+a)^3} & \dfrac{-\Gamma a^3 s^2}{(s+a)^3} \\ \dfrac{\Gamma a^3 s^2}{(s+a)^3} & \dfrac{a^3\beta\left(s^2 + \dfrac{1}{\beta}\right)}{(s+a)^3} \end{bmatrix} u \qquad \text{Eq. 21}$$

where:

$$\beta = \frac{g}{L\left[\left(\dfrac{g}{L}\right)^2 + \dot{\gamma}^2\right]} \qquad \Gamma = \frac{\ddot{\gamma}}{\left(\dfrac{g}{L}\right)^2 + \dot{\gamma}^2} \qquad \text{Eq. 22}$$

The filters of Eq. 21 operate on the inputs as defined by Eqs. 8 and 9, or, individually the filters can be expressed as:

$$u_{1_F} = \frac{a^3\beta\left(s^2+\dfrac{1}{\beta}\right)}{L(s+a)^3}[\ddot{x}] + \frac{\Gamma a^3 s^2}{L(s+a)^3}[x\dot{\gamma}] \qquad \text{Eq. 23}$$

$$u_{2_F} = \frac{\Gamma a^3 s^2}{L(s+a)^3}[\ddot{x}] - \frac{a^3\beta\left(s^2+\dfrac{1}{\beta}\right)}{L(s+a)^3}[x\dot{\gamma}].$$

The coupled (x and γ quantities are present in both filters) filtered inputs, $\ddot{x}$ and $\ddot{\gamma}$, to the sway dynamics of Eq. 7 become:

$$\ddot{x}_F = \frac{a^3\beta\left(s^2+\dfrac{1}{\beta}\right)}{(s+a)^3}[\ddot{x}] + \frac{\Gamma a^3 s^2}{(s+a)^3}[x\dot{\gamma}] \qquad \text{Eq. 24}$$

$$\ddot{\gamma}_F = \frac{(\Gamma a^3 s^2)}{(s+a)^3}[\ddot{x}] - \frac{a^3\beta\left(s^2+\dfrac{1}{\beta}\right)}{x(s+a)^3}[x\dot{\gamma}]$$

where, of course, trolley acceleration $\ddot{x}$ and jib angular acceleration $\ddot{y}$ are the commanded quantities (commanded by the operator), and load-line length L and trolley position x are continuously measured by, for example, encoders. These quantities are integrated to obtain the velocity inputs. Note, that if the jib angular acceleration γ is significantly less than the static pendulum natural frequency $\omega=\sqrt{g/L}$, where g is gravity (9.8 m/s²) and L is the length of load-line 110 as shown in FIG. 1, then from Eq. 22, Γ is approximately zero. The filters of Eq. 24 are then decoupled; in most cases, the filters can be decoupled. Because the tuning (e.g., selecting design constraint "a" such that a critically-damped motion is achieved) of the input-shaping filters is system dependent (configuration dependent), examples are provided hereinafter.

2. Simulation of First Embodiment (Operator In-The-Loop)

The particular values and configurations discussed in the following non-limiting example of the first embodiment can be varied and are cited merely to illustrate the first embodiment of the present invention and are not intended to limit the scope of the invention. This exemplary test system of the first embodiment was intended for use not only as a control algorithm testbed, but also as a crane operator training device. In a simulation environment, crane operators can be trained to perform manual swing-free maneuvers. Results are presented for operator in-the-loop positioning using a real-time dynamics simulation of a three-axis rotary crane where the residual sway magnitude is reduced in excess of 40-dB.

A real-time, operator in-the-loop crane simulator was used to demonstrate and test the forward path filters defined above in Eq. 24. The computational portion of the system used a dSPACE platform. Specifically, a DSP board (DS3001) was used for performing the sway simulation and for filter implementation, both running at 100-Hz. The simulator allowed the operator to enter velocity commands in the three-axes using two analog joysticks; the three-axis commands were supplied by an operator using two analog joysticks. Two Gravis analog joysticks were connected to a multi-I/O board (DS2201) and were sampled at 10-Hz. Visual cues of the crane motion and sway properties were supplied to the operator via a graphical output of the results of a real-time simulation of the crane sway dynamics; operator feedback of payload motion and sway dynamics was provided by a graphical user interface (e.g., COCKPIT). For comparison purposes, the unfiltered crane acceleration inputs were simultaneously passed to a duplicate version of the crane sway dynamics.

Because the jib rotation acceleration is typically well below $\omega=\sqrt{g/L}$, the decoupled version of the filters of Eq. 24 was used as well as the approximation of β as $\beta \approx L/g$. Load-line length actuator dynamics were approximated by a 0.2-Hz low pass filter on load-line 110 length velocity commands. Furthermore, it was found that the filtering of the quantity xγ for the $\dot{\gamma}_F$ filter of Eq. 24 resulted in a necessary operator correction for residual velocity due to a lack of synchronization between the filtered and unfiltered position x of trolley 120, expressed compactly by:

$$\frac{[x\dot{\gamma}]_F}{x} \neq \dot{\gamma}_F \qquad \text{Eq. 25}$$

In practice, the filters $\ddot{x}_F$ and $\ddot{y}_F$ are preferably synchronized.

The filter design was performed by assuming that position x of trolley 120 was constant over each finite length sample period (in practice, position x would be measured). The resulting decoupled filters are:

$$\ddot{x}_F = \frac{a^3\dfrac{L}{g}\left(s^2+\dfrac{g}{L}\right)}{(s+a)^3}[\ddot{x}] \qquad \ddot{y}_F = \frac{a^3\dfrac{L}{g}\left(s^2+\dfrac{g}{L}\right)}{(s+a)^3}[\ddot{y}] \qquad \text{Eq. 26}$$

where the single design parameter, a, was chosen as 2.0, but other values can be used as will become apparent to those skilled in the art. While the filter in Eq. 26 is an expression of the trolley's linear acceleration and the jib's angular acceleration, the same filter works equally well on the trolley's linear velocity and jib's angular velocity because load-line length L, gravity g, and design parameter a are constant over the sampling interval. The filters were implemented by converting the continuous-time, state space representation to a discrete-time representation in a manner well known to those skilled in the art [see, e.g., C. T. Chen, Linear System Theory and Design, Holt, Rinehart, and Winston, New York, N.Y. (1984)].

Figure 2:
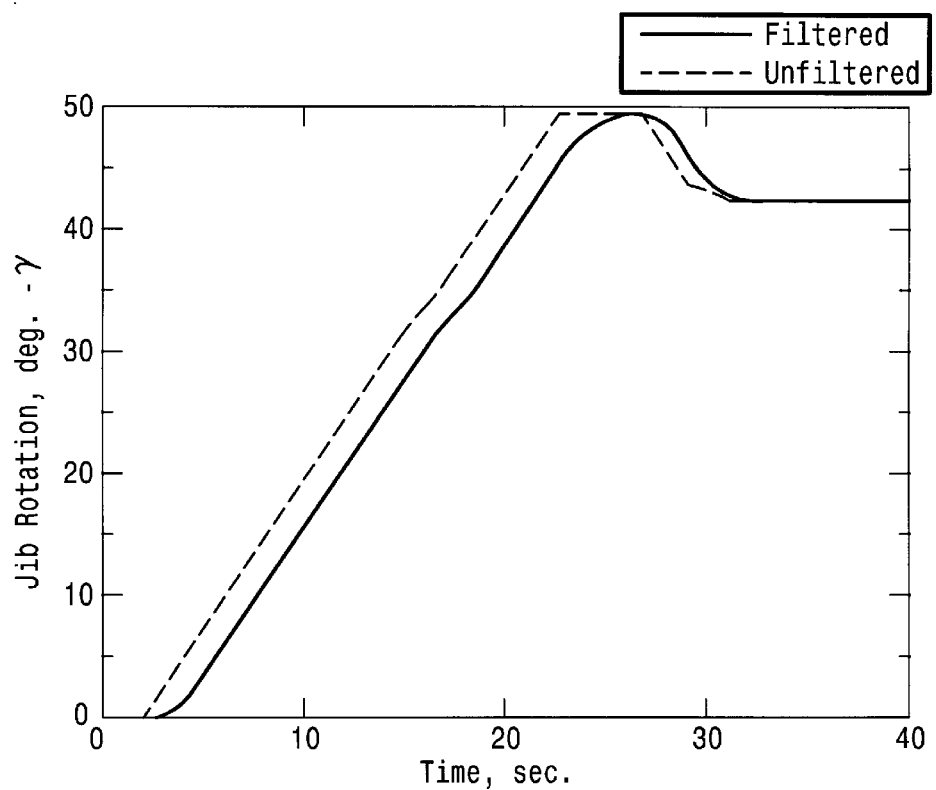
FIG. 2 is a graph of jib rotation time history for filtered and unfiltered input commands of a first embodiment in accordance with the present invention with jib rotation (in degrees) versus time (in seconds).
Figure 3:
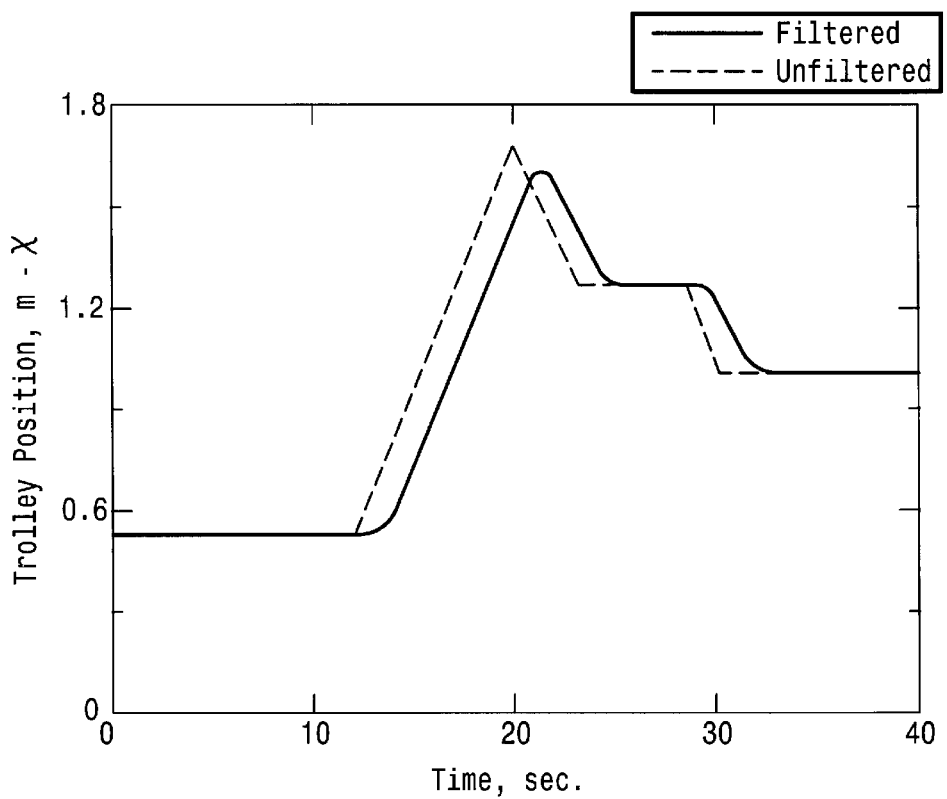
FIG. 3 is a graph of trolley position time history for filtered and unfiltered input commands of a first embodiment in accordance with the present invention with trolley position (in meters) versus time (in seconds).
Figure 4:
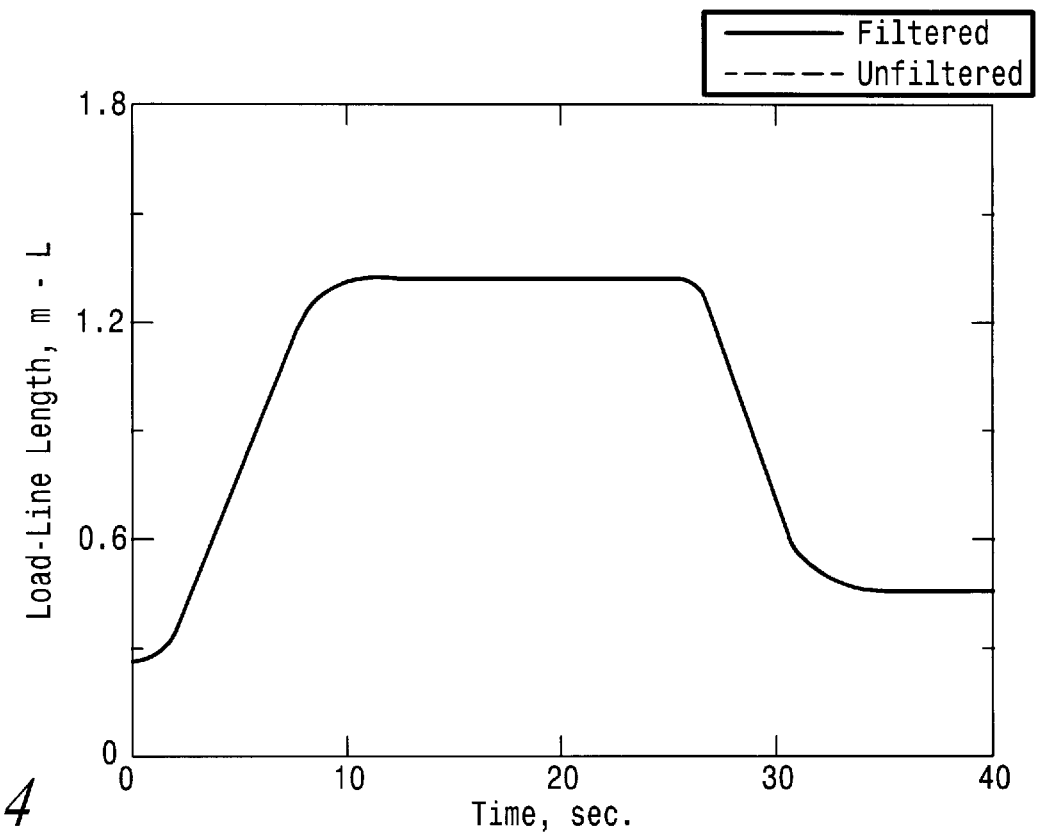
FIG. 4 is a graph of load-line length time history for filtered input commands of a first embodiment in accordance with the present invention with load-line length (in meters) versus time (in seconds).
Figure 5:
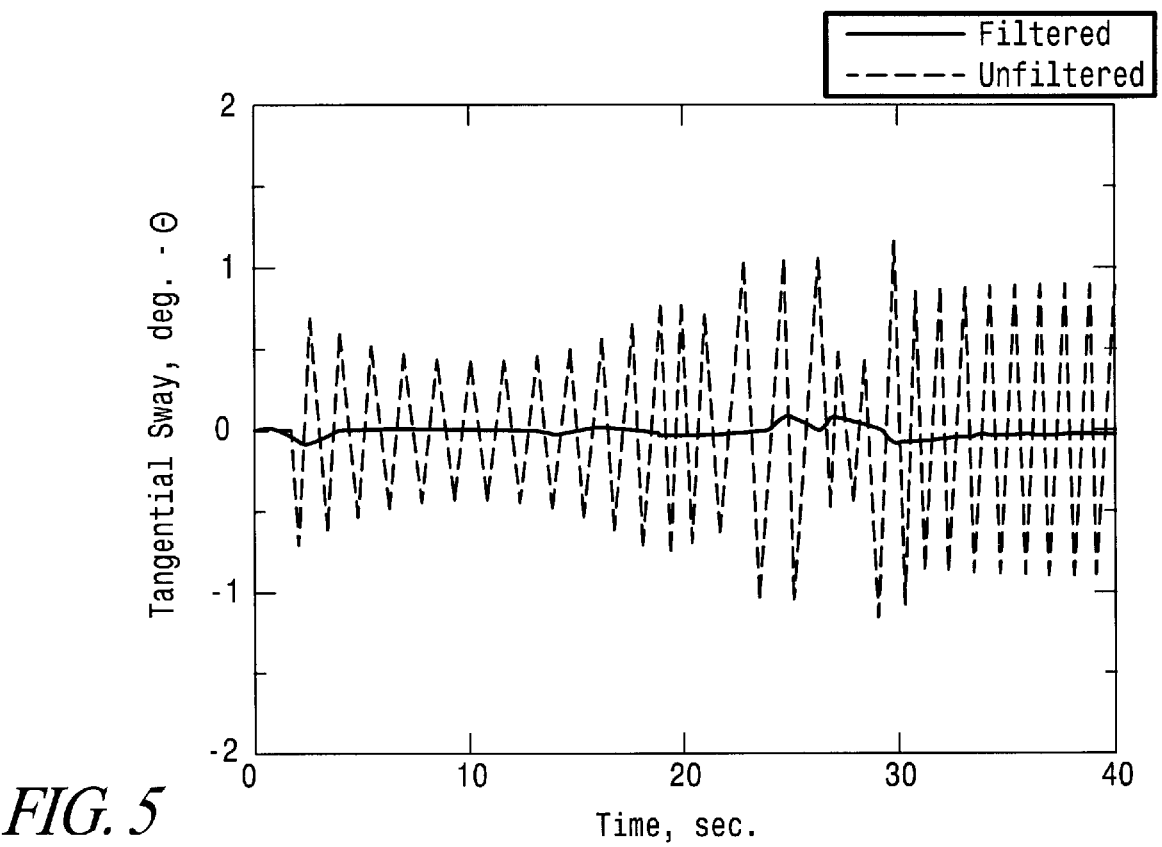
FIG. 5 is a graph of tangential payload sway for filtered and unfiltered input of a first embodiment in accordance with the present invention with tangential sway (in degrees) versus time (in seconds).
Figure 6:
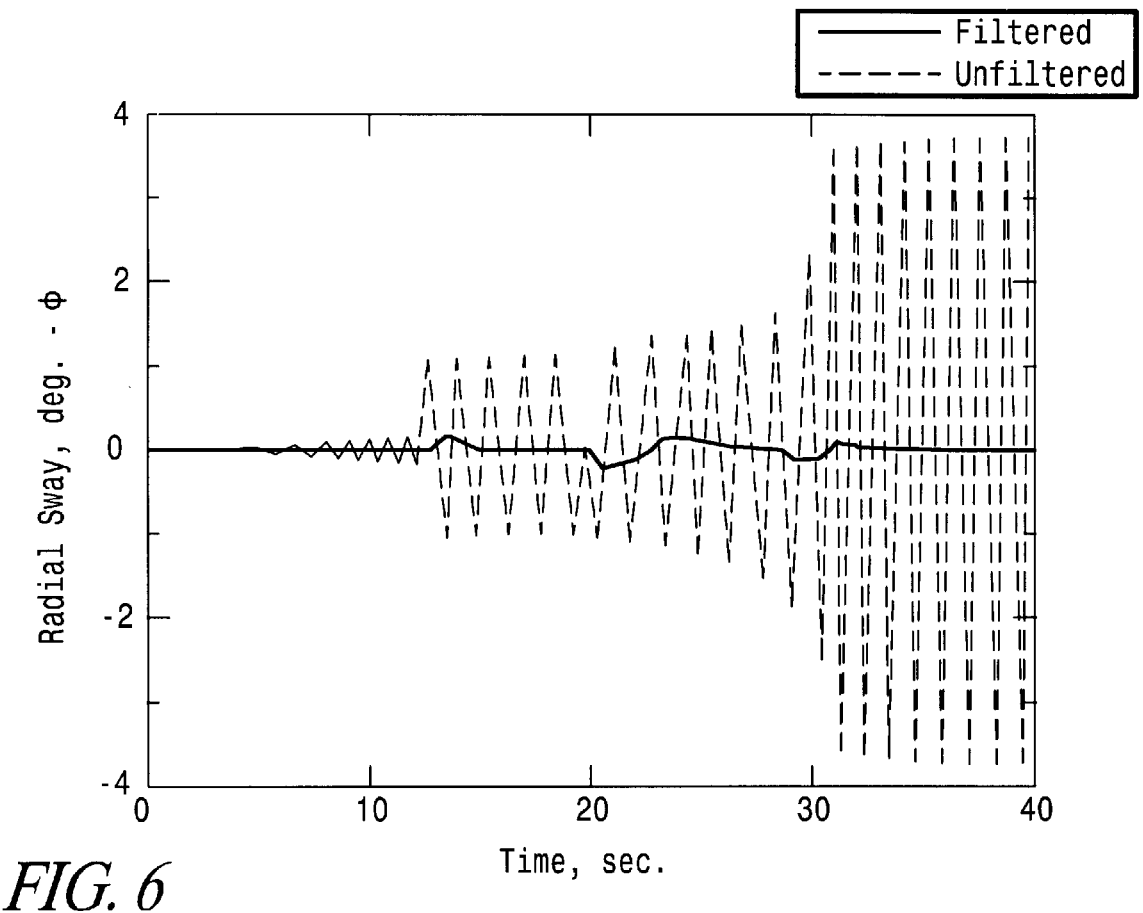
FIG. 6 is a graph of radial payload sway for filtered and unfiltered inputs of a first embodiment in accordance with the present invention with radial sway (in degrees) versus time (in seconds).

The results presented began with length L of load-line 110 initially at 0.25-m (a 1-Hz non-rotating natural frequency), position x of trolley 120 was at 0.5-m, and jib rotation angle γ was at 0°. Data was recorded at 10-Hz for an arbitrary set of joystick 45 commands over a 40-second period. Plots of the jib (FIG. 2), trolley (FIG. 3), and load-line (FIG. 4) motion are shown in FIG. 2 through FIG. 4 (filtered shown in solid lines, and unfiltered shown in dotted lines). FIG. 2 is a graph of jib rotation γ time history for filtered and unfiltered input commands of the first embodiment with jib rotation angle γ (in degrees) versus time (in seconds). FIG. 3 is a graph of trolley position x time history for filtered and unfiltered input commands of the first embodiment with trolley position (in meters) versus time (in seconds). FIG. 4 is a graph of load-line length time history for filtered input commands of the first embodiment with load-line length L (in meters) versus time (in seconds). The noticeable lag between filtered and unfiltered motion in the rotationγ of jib 140 and the position x of trolley 120 is due to the notch filtering discussed previously. The configuration-dependent notch filtering yielded a decrease in the residual oscillation magnitude of 43-dB in the tangential (θ) direction and a decrease in the residual oscillation magnitude of 47-dB in the radial (φ) direction as shown by the tangential θ and radial φ sway histories of FIG. 5 and FIG. 6 (filtered shown in solid lines, and unfiltered shown in dotted lines). FIG. 5 is a graph of tangential payload sway θ for filtered and unfiltered inputs with tangential payload sway θ (in degrees) versus time (in seconds). FIG. 6 is a graph of radial φ payload sway for filtered and unfiltered inputs with radial payload sway φ (in degrees) versus time (in seconds).

In summary of the first embodiment, a method and apparatus for reducing the residual oscillation of operator in-the-loop point-to-point rotary crane maneuvers has been presented. Testing was performed using an operator in-the-loop crane simulator designed as a control algorithm testbed and a crane operator training device. Configuration-dependent notch filters are demonstrated above for filtering forward path velocity commands of the jib rotation speed $\dot{\gamma}$ and trolley speed $\dot{x}$. Operator-in-the-loop, real-time simulation indicates a decrease in the residual oscillation magnitude in excess of 40-dB in both the tangential and radial directions. Unlike the optimization-based methods presented in the second embodiment below (without operator-in-the-loop control), the forward path filter design of the first embodiment does not require a priori knowledge of the specific maneuver of interest.

C. SECOND EMBODIMENT

Figure 7:
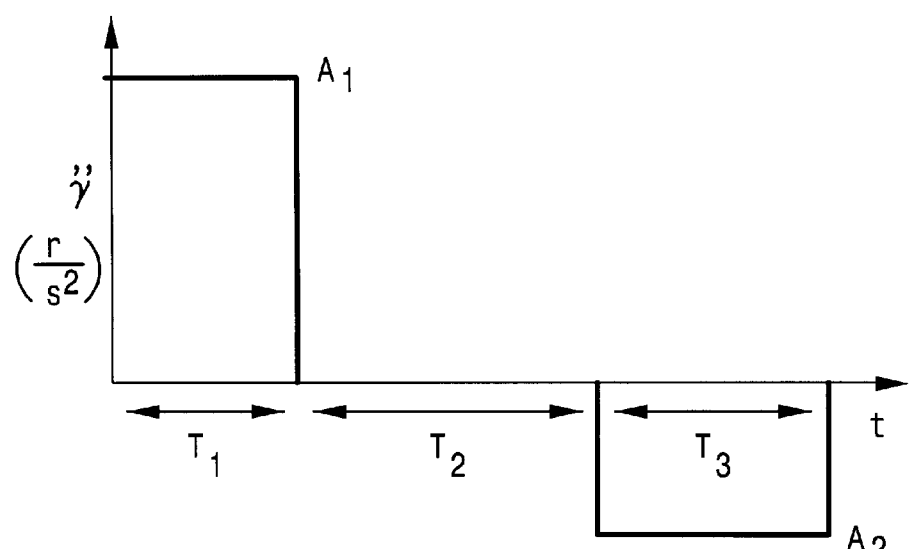
FIG. 7 is a graph of postulated jib angular acceleration γ rotation time history of a second embodiment in accordance with the present invention with angular acceleration versus time.

In this second embodiment (computer controlled without operator-in-the-loop), a method and apparatus is presented for determining and generating open-loop trajectories (inputs) for the rotation of jib 140 for accomplishing fixed-time, point-to-point, residual oscillation-free, symmetric, vibration-suppressed rotary-crane maneuvers. The exemplary residual oscillation-free trajectories presented by the second embodiment purposely excite the spherical pendulum modes in such a way that, at the end of the maneuver, the oscillatory degrees-of-freedom are quiescent. The second embodiment addresses residual oscillation-free rotary jib crane maneuvers and compares different parameter optimization methods (e.g., recursive quadratic programming) for generating the crane commands so that sway is controlled. The primary maneuver of interest is the residual oscillation, point-to-point movement of a payload 130. The input angular acceleration $\ddot{\gamma}$ to the jib motor is postulated as having a pulse-coast-pulse form as shown in FIG. 7. An optimization method and computer implementation thereof is used to generate the parameters that define this pulse sequence such that the maneuver is residual oscillation free (comparable optimizations are performed for the other inputs: trolley acceleration $\ddot{x}$ and load-line length velocity $\dot{L}$). The second embodiment uses the postulated shape of FIG. 7 for the angular acceleration profile $\ddot{\gamma}(t)$ of jib 140. This pulse profile is uniquely determined by a small set of parameters such as acceleration pulse amplitude, duration and coast time between pulses. Using an accurate simulation of the rotary-crane system in conjunction with a numerical optimization code, the pulse profile parameters are obtained as the solution to a minimization problem. The quantity minimized is representative of the amount of residual oscillation of payload 130 after completing the desired maneuver. Of secondary interest, are maneuvers where payload 130 oscillates in a specified manner at the end of the maneuver. Again, the pulse sequences are designed via numerical optimization and computer implemented. Experimental results for these maneuvers verify the results of the numerical optimization method. Exemplary simulation results are presented below for the second embodiment along with experimental verification thereof. Unlike the first embodiment, knowledge of the initial and final configurations (x,γ,L,m) is required in advance for the second embodiment to result in zero tangential and radial sway. The equations of motion and hardware description provided above apply to this second embodiment as well.

Figure 1C:
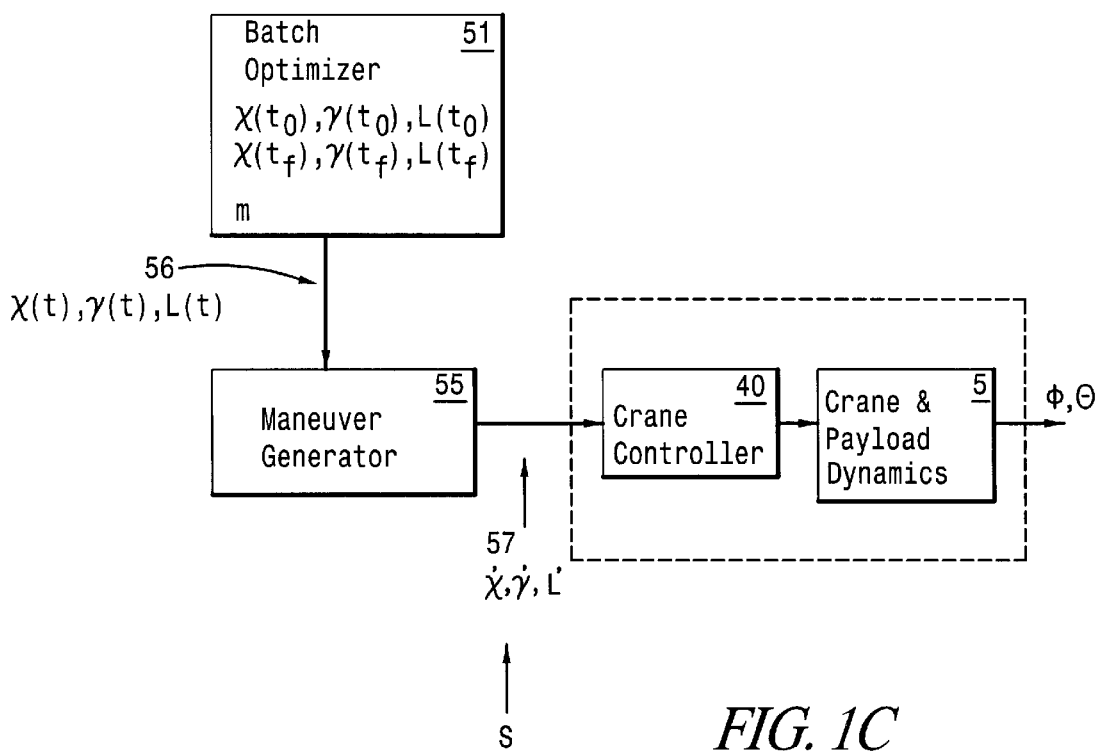
FIG. 1C is a block diagram of an open-loop model of the overall crane control system including a maneuver generator in accordance with the second and third embodiments of the present invention.

Referring to FIG. 1C, the various components or subassemblies of the system S now will be described in detail. Maneuver generator 55 is used to generate commands for predetermined paths of rotary-style crane 5 to accomplish a residual oscillation-free maneuver based on the governing equations of motion and the various maneuver generation embodiments presented herein. In practice, maneuver generator 55 can be implemented by programming a general purpose digital computer (as described above with reference to FIG. 1A) positioned in such a way to interface with crane controller 40; it can be implemented as an embedded, programmed, digital computer. The system and method of the present invention is adapted to run on a general purpose digital computer that is programmed with the equations described herein. However, maneuver generator 55 can also be implemented in hardware (e.g., electronic circuit) and such implementation is intended to be covered by the claims of the present invention. Initial and final conditions for mass m, trolley position x, jib angle γ, and length L are provided by an operator to a batch optimizer 51 (via input unit 4 in FIG. 1A) as shown in FIG. 1C. Signals 56 are provided to maneuver generator 55 as a function of time. Signals 57 (trolley, jib angle and load-line length velocities) are provided to the crane controller 40 as a function of time. Several embodiments of maneuver generator 55 are presented hereinafter.

As mentioned above, several maneuvers are examined all of which have a 90° jib rotation (initial γ=0° and final γ=90°); 90° jib rotation is presented here for convenience only and other angles could be used as will become apparent to those skilled in the art. The first maneuver is designed such that payload 130 is residual oscillation free. The second maneuver allows only tangential oscillation at the end of the maneuver. The third maneuver allows only radial oscillation of the maneuver.

In the second embodiment, a numerical solution for the hub rotation γ(t) yielding the desired residual motion of payload 130, is found by relying on the equations of motion presented in Eq. 7.

1. Maneuver Design For Second Embodiment

Maneuvers are generated and computer implemented (for control of the maneuvers by the computer) by first postulating the jib angular acceleration profile $\ddot{\gamma}(t)$ having the pulse-coast-pulse form shown in FIG. 7. It is important to note that a pulse sequence is not always required and will depend on the application of interest. Furthermore, it is important to note that $\ddot{x}(t)$ and $\dot{L}(t)$ are also subject to being optimized via the dynamic programming approach presented herein as will become apparent to those skilled in the art; although the discussion regarding jib angular acceleration profile $\ddot{y}(t)$ has been presented for illustration purposes only, similar rationale applies for the other two inputs $\ddot{x}(t)$ and $\ddot{L}(t)$. The choice of this pulse-coast-pulse form is based on, but significantly different from, similar work regarding residual oscillation-free slewing of a flexible rod [See B. J. Petterson and R. D. Robinett, Model-Based Damping of Coupled Horizontal and Vertical Oscillations in a Flexible Rod, Journal of Intelligent Robotic Systems, vol. 4, pp. 285–299 (1991)]. In that slewing rod application, the slewing was performed in the horizontal plane. However, due to gravitational and centrifugal effects, vibration was excited in both the horizontal and vertical directions. It was shown how a rotation profile could be generated such that vibration in both directions was suppressed at the end of the maneuver. While both the slewing rod application and the spherical pendulum problem considered for the rotary crane herein exhibit coupled dynamics, the physics of and the coupling between modes of oscillation in the two applications are significantly different.

The asymmetric (due to varying load-line length L) jib angular acceleration profile $\ddot{y}(t)$ of FIG. 7 is uniquely described by the predetermined amplitude of the first pulse $A_1$, the duration of the first pulse $T_1$, the duration of the coast $T_2$, and the duration of the second pulse $T_3$. The amplitude of the second pulse $A_2$, is determined by the requirement of zero jib angular velocity $\dot{\gamma}$ at the end of the maneuver, or:

$$A_2 = \frac{A_1 T_1}{T_3} \qquad \text{Eq. 27}$$

These four parameters (of Eq. 27) are obtained using the recursive quadratic programming numerical optimization code developed by Hopper [M. J. Hopper, Harwell Subroutine Library, AERE-R9185, UKAEA, Harwell, Oxon., UK (1978)] in a manner well known to those skilled in the art (the equations of motion are optimized). The minimized cost function has the form:

$$J = w_1 \theta^2(t_f) + w_2 \dot{\theta}^2(t_f) + w_3 \phi^2(t_f) + w_4 \dot{\phi}^2(t_f) \qquad \text{Eq. 28}$$

where the weighting coefficients $w_i$ (where i=1,2,3,4) are selected based on the type of residual oscillation desired. Equality constraints are used to ensure the completion of the 90° jib rotation. Evaluation of the cost function (Eq. 28) and the constraint equations requires the integration of the equations of motion of Eq. 7, which is accomplished using fourth-order Runge-Kutta integration with a time step of 0.001 seconds in a manner well known to those skilled in the art.

2. Results of Second Embodiment

The particular values and configurations discussed in this non-limiting example of the second embodiment can be varied and are cited merely to illustrate the second embodiment of the present invention and are not intended to limit the scope of the invention.

The experimental system for the second embodiment used a constant velocity, computer-controlled direct-drive, motor. Physical values for trolley position x, payload mass m, and load-line length L that were used in the experimental system are provided in Table 1.

TABLE 1

Physical quantities used for the experimental apparatus of the second embodiment.

| PARAMETER | UNITS | VALUE |
|---|---|---|
| x | meters | 0.659 |
| L | meters | 0.251 |
| m | kilograms | 0.050 |

Table 2 shows the parameters obtained via the optimization process described above, which result in the three maneuvers of interest: the first maneuver is designed such that payload 130 is residual oscillation free (no oscillation); the second maneuver allows only tangential θ oscillation at the end of the maneuver; and the third maneuver allows only radial φ oscillation of the maneuver.

TABLE 2

Jib acceleration parameters for the specific maneuvers considered.

| PARA-METER | NO OSCILLATION | RADIAL φ OSCILLATION ONLY | TANGENTIAL θ OSCILLATION ONLY |
|---|---|---|---|
| $A_1$ (Rad/s$^2$) | 1.2798 | 2.3333 | 1.3528 |
| $T_1$ (s) | 0.90684 | 0.52440 | 0.88550 |
| $T_2$ (s) | 0.44655 | 0.58515 | 0.50637 |
| $T_3$ (s) | 0.90684 | 0.86981 | 0.72376 |

Figure 8:
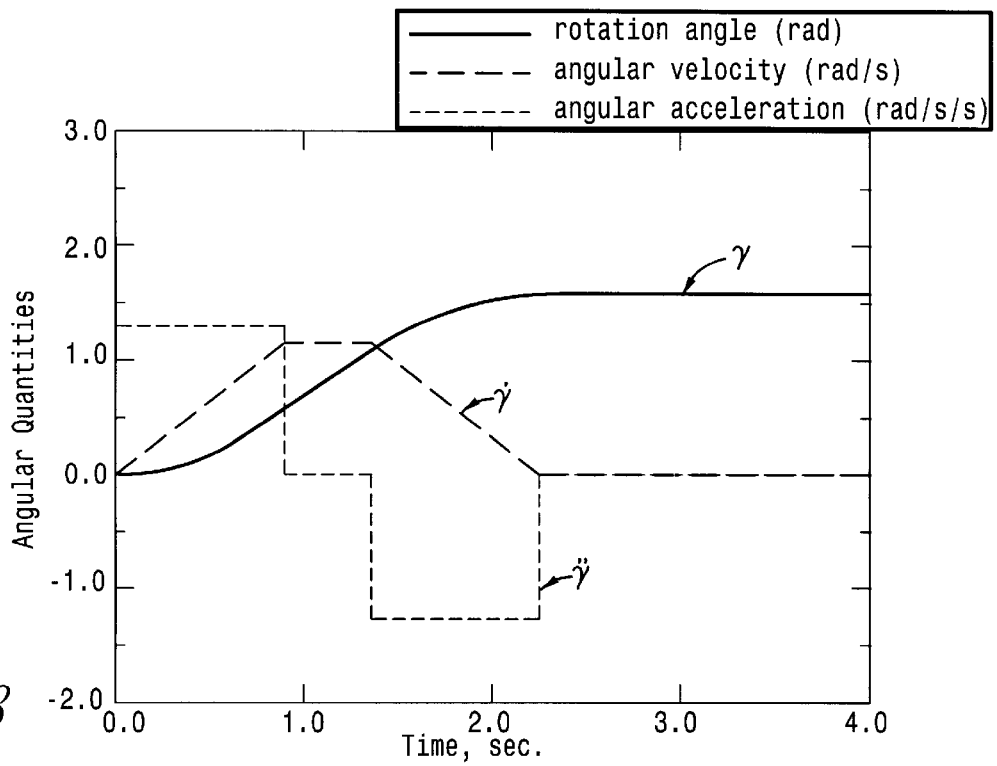
FIG. 8 is a graph of a residual oscillation-free (no oscillation) maneuver of a second embodiment in accordance with the present invention with angular quantities versus time (in seconds).
Figure 9:
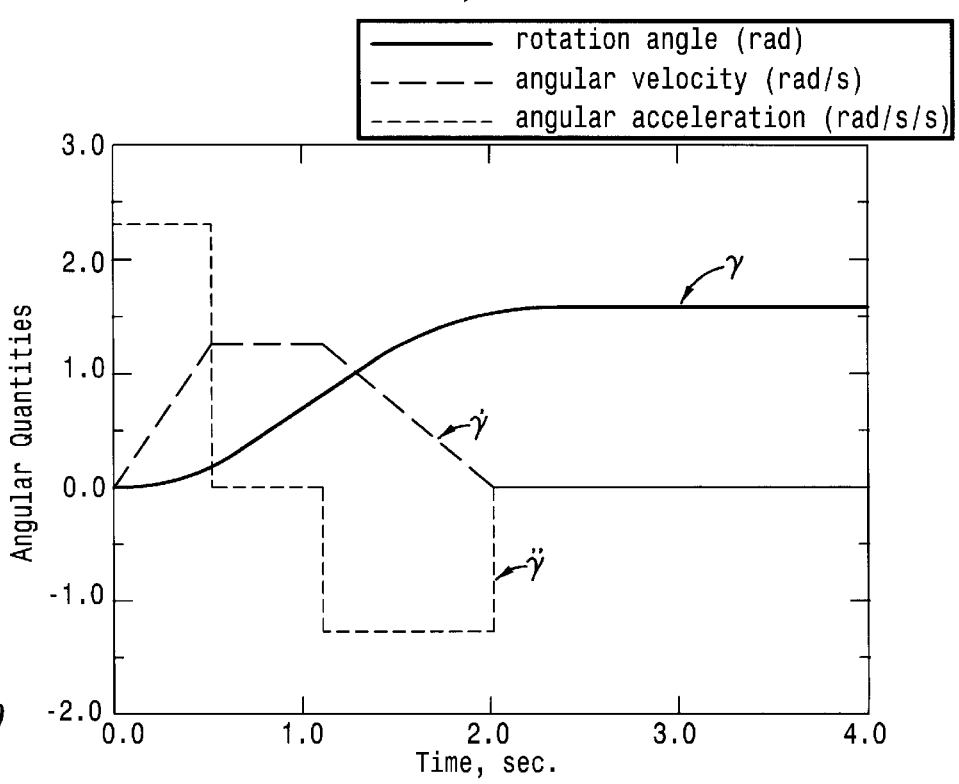
FIG. 9 is a graph of a radial oscillation only maneuver of a second embodiment in accordance with the present invention with angular quantities versus time (in seconds).
Figure 10:
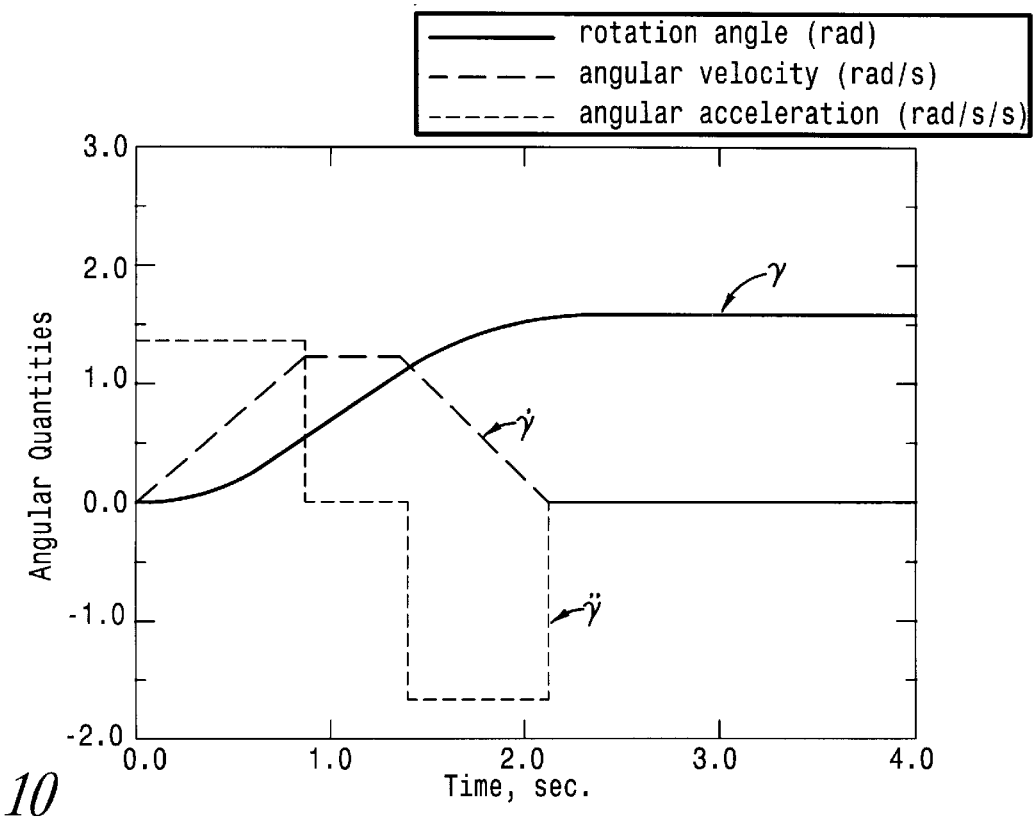
FIG. 10 is a graph of a tangential oscillation only maneuver of a second embodiment in accordance with the present invention with angular quantities versus time (in seconds).

Note that the parameter values for $T_1$ and $T_3$ are symmetrical in this specific case to obtain no oscillation maneuvers because x and L are fixed; in practice, the parameter values are asymmetrical as illustrated in FIG. 7 because x and L vary. Plots of jib rotation are shown in FIG. 8 through FIG. 10. FIG. 8 is a graph of a residual oscillation-free (no oscillation) maneuver of the second embodiment with angular quantities $(\gamma, \dot{\gamma}, \ddot{\gamma})$ versus time (in seconds). FIG. 9 is a graph of a radial oscillation only maneuver of the second embodiment with angular quantities $(\gamma, \dot{\gamma}, \ddot{\gamma})$ versus time (in seconds). FIG. 10 is a graph of a tangential oscillation only maneuver of the second embodiment with angular quantities $(\gamma, \dot{\gamma}, \ddot{\gamma})$ versus time (in seconds).

The angular acceleration profiles implemented on the hardware described above produced the desired maneuvers with no modification of the inputs, which demonstrates an excellent ability to model and simulate this system. The absence of residual oscillation was determined by observation during testing. Due to the agreement between simulation and experiment, only simulation plots are presented.

Figure 11:
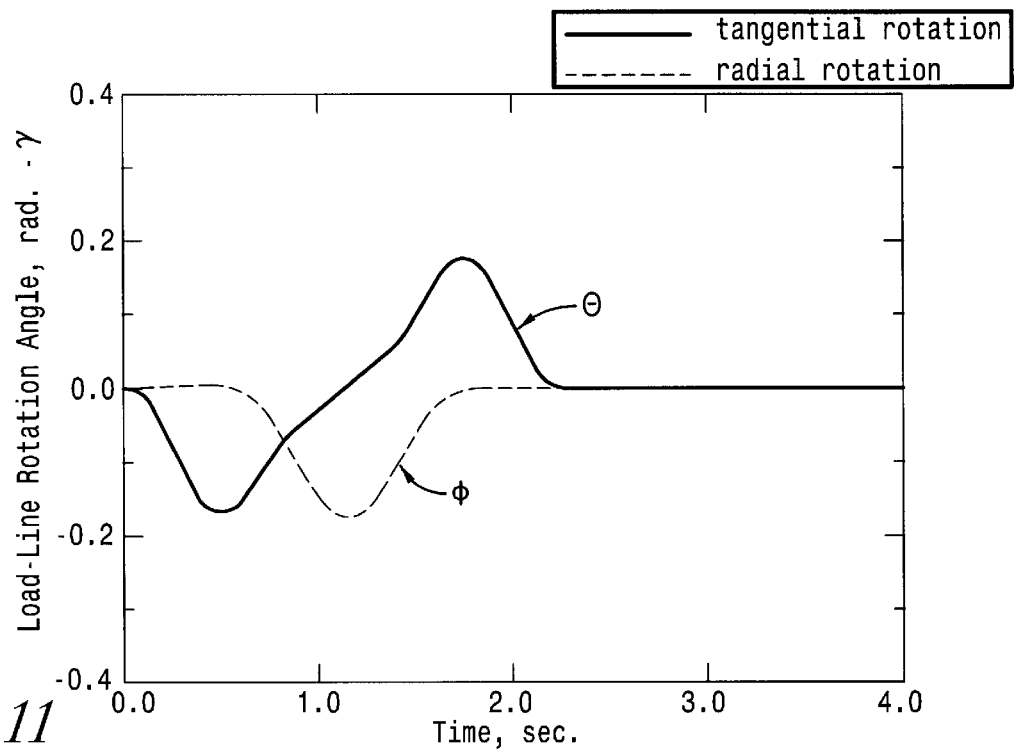
FIG. 11 is a graph of a residual oscillation-free (no oscillation) maneuver of a second embodiment in accordance with the present invention with load-line rotation angle (in radians) versus time (in seconds).
Figure 12:
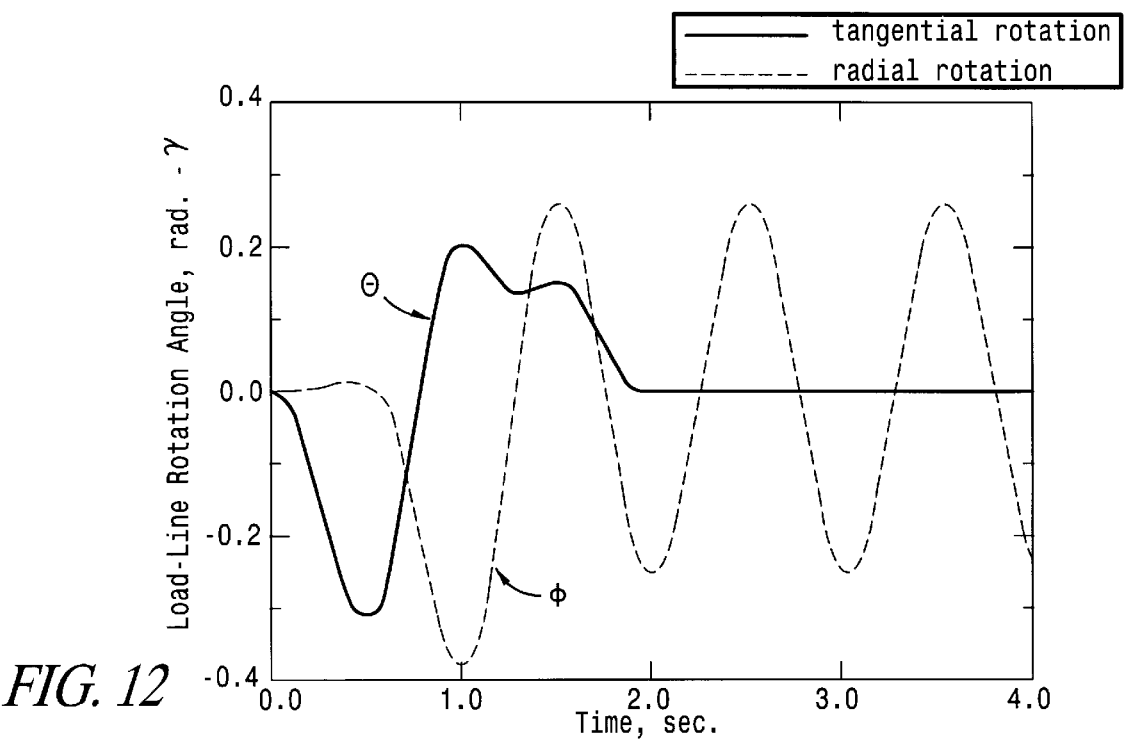
FIG. 12 is a graph of a radial oscillation only maneuver of a second embodiment in accordance with the present invention with load-line rotation angle (in radians) versus time (in seconds).
Figure 13:
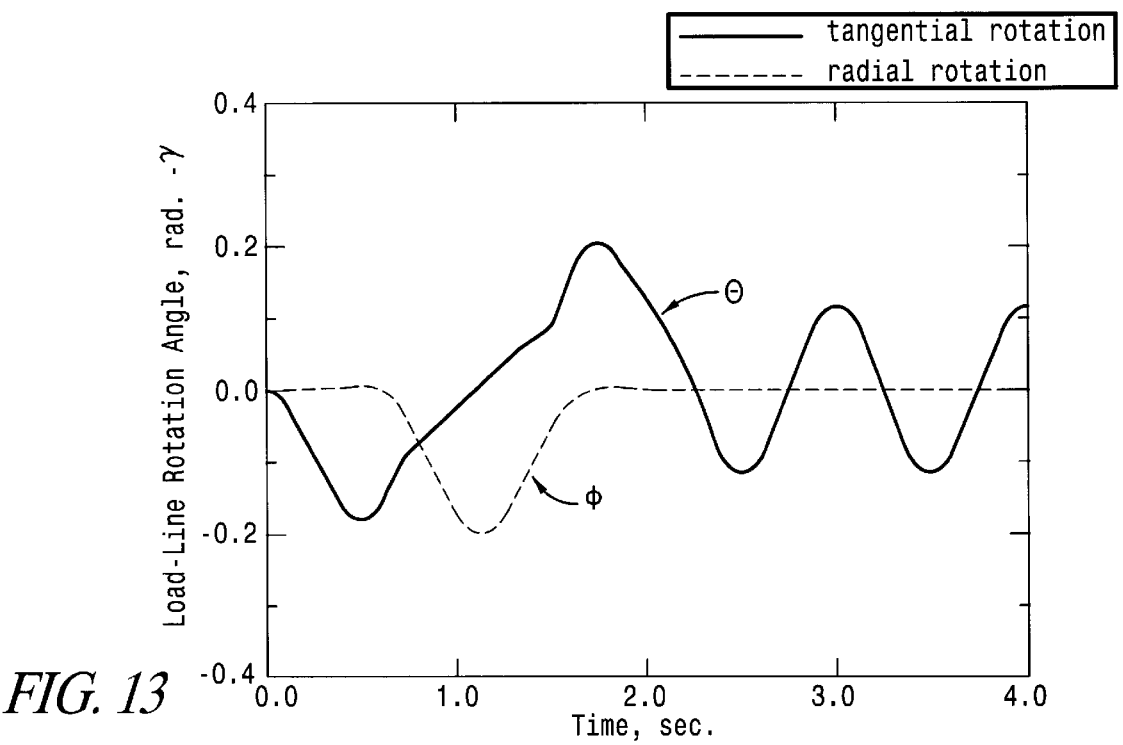
FIG. 13 is a graph of a tangential oscillation only maneuver of a second embodiment in accordance with the present invention with load-line rotation angle (in radians) versus time (in seconds).

The residual oscillation free maneuver of FIG. 8 uses an acceleration profile that is symmetric in time about the half period of the maneuver. Allowing pendulum sway in either the radial or tangential directions only, requires non-symmetric acceleration histories as shown in FIG. 9 and FIG. 10 because x and L are fixed for purposes of illustration. Plots of the pendulum sway are shown in FIG. 11 through FIG. 13. FIG. 11 is a graph of a residual oscillation-free (no oscillation) maneuver of the second embodiment with load-line rotation angle (in radians) versus time (in seconds). FIG. 12 is a graph of a radial oscillation only maneuver of the second embodiment with load-line rotation angle (in radians) versus time (in seconds). FIG. 13 is a graph of a tangential oscillation only maneuver of the second embodiment with load-line rotation angle (in radians) versus time (in seconds).

Figure 14:
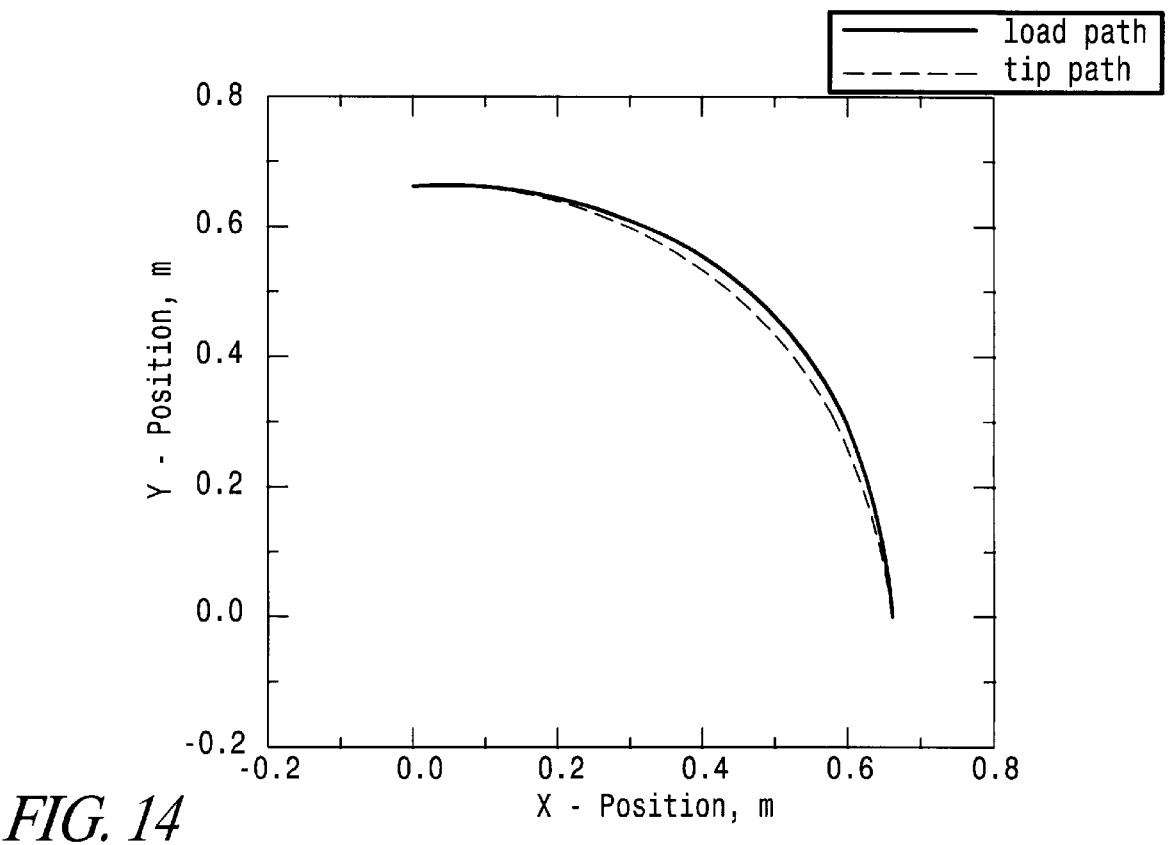
FIG. 14 is a graph of a residual oscillation-free (no oscillation) maneuver of a second embodiment in accordance with the present invention with Y-position (in meters) versus X-position (in meters).
Figure 15:
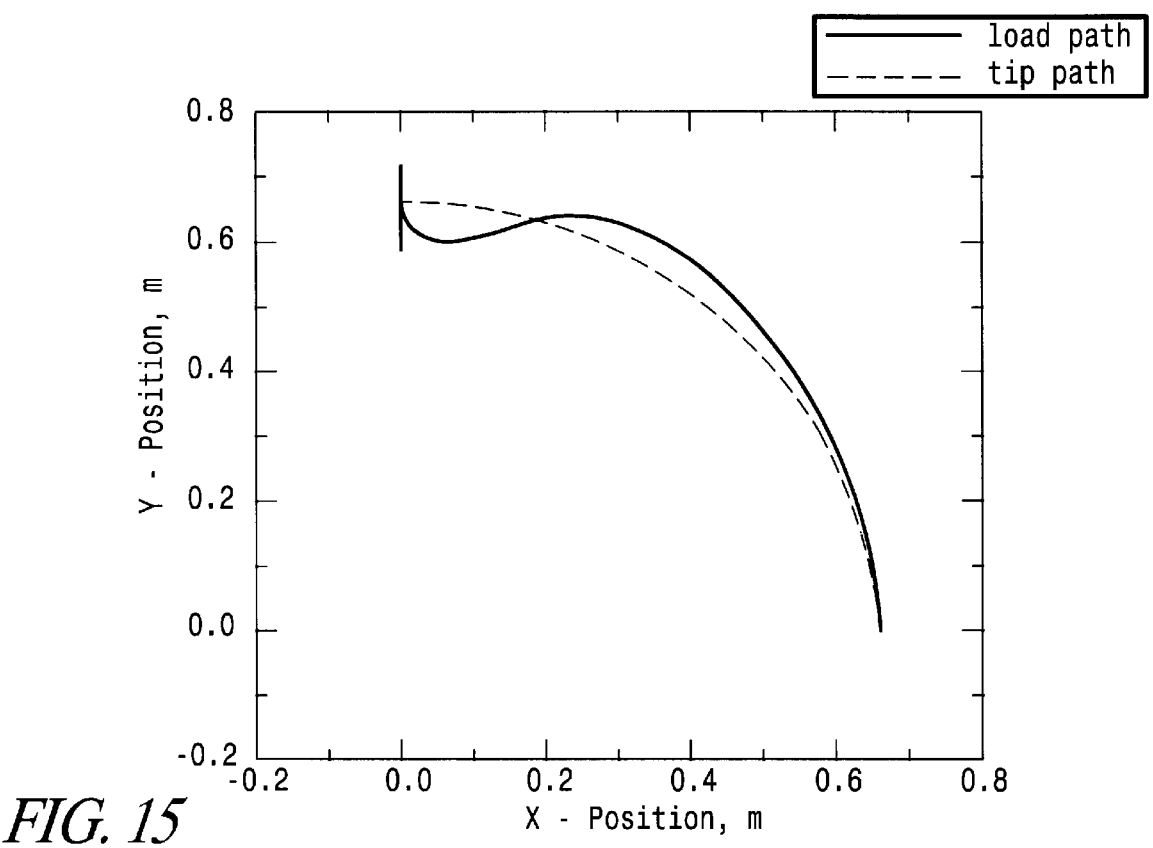
FIG. 15 is a graph of a radial oscillation only maneuver of a second embodiment in accordance with the present invention with Y-position (in meters) versus X-position (in meters).
Figure 16:
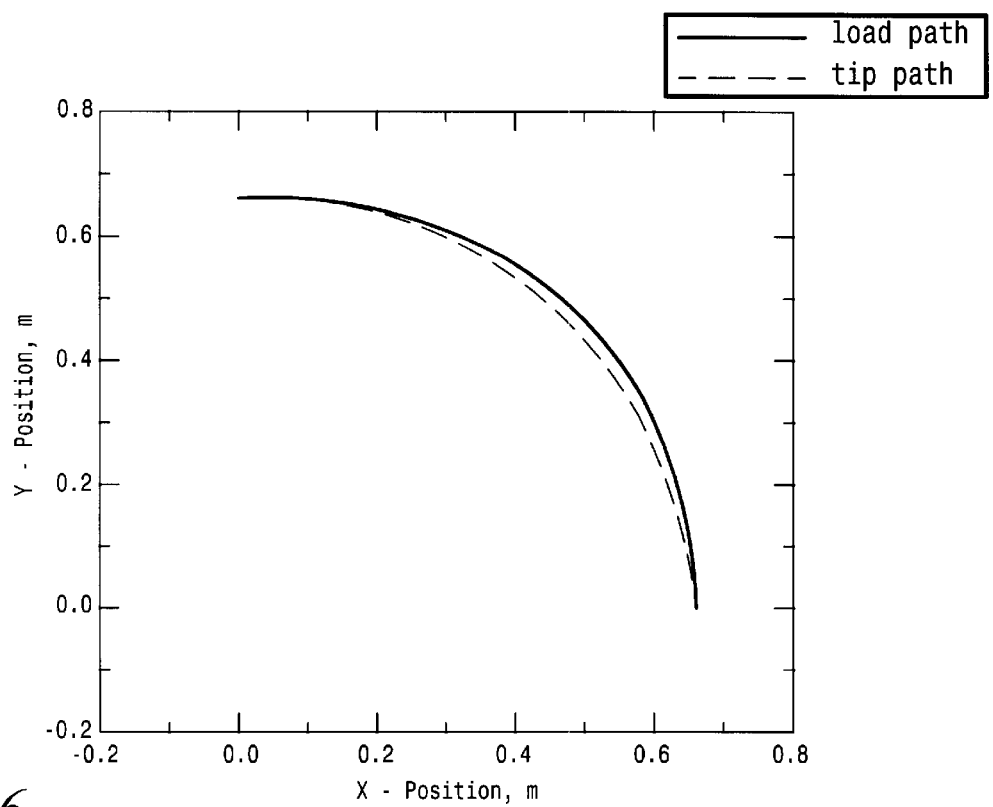
FIG. 16 is a graph of a tangential oscillation only maneuver of a second embodiment in accordance with the present invention with Y-position (in meters) versus X-position (in meters).

Centrifugal effects during the maneuver are illustrated by FIG. 14 through FIG. 16, which show the projection of the payload 130 and the jib end onto the horizontal surface. FIG. 14 is a graph of a residual oscillation-free (no oscillation) maneuver of the second embodiment with y-position (in meters) versus x-position (in meters). FIG. 15 is a graph of a radial oscillation only maneuver of the second embodiment with y-position (in meters) versus x-position (in meters). FIG. 16 is a graph of a tangential oscillation only maneuver of the second embodiment with y-position (in meters) versus x-position (in meters). In all cases the payload 130 is observed moving initially outward from the tip path.

The acceleration profiles developed here purposely excite the oscillatory motion of payload 130. This is illustrated by investigating the Fourier series of the acceleration history. Examination of the quasi-static stiffness matrix of Eq. 7 throughout the residual oscillation-free maneuver indicates only slight changes in the quasi-static natural frequencies of the payload 130. Specifically, the nominal (non-rotating) natural frequency in both radial and tangential directions is 0.995-Hz. The initial acceleration pulse, with zero velocity, results in a slight increase of this frequency. However, the softening effect of the angular velocity $\dot{\gamma}$ during the maneuver causes the quasi-static natural frequency to decrease to 0.978-Hz at the half-period of the maneuver. This change in quasi-static natural frequency is symmetric in time about the half-period.

Figure 17:
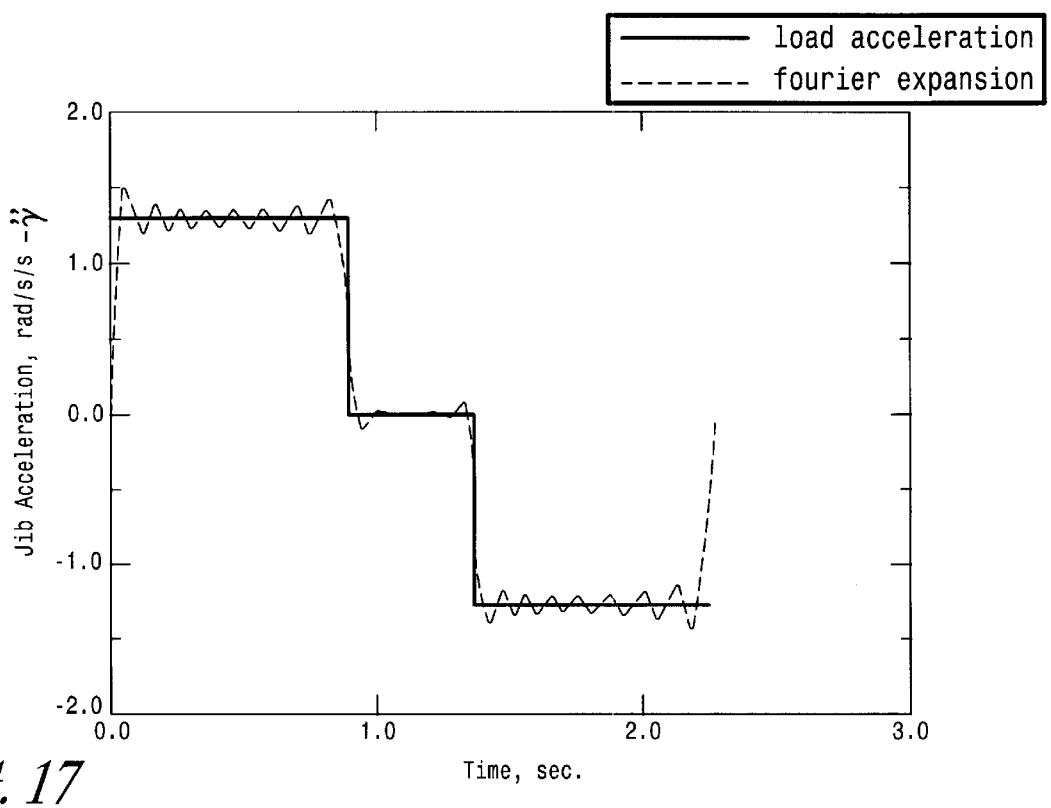
FIG. 17 is a graph of an acceleration and Fourier expansion of a second embodiment in accordance with the present invention with jib acceleration (in radians/sec$^2$) versus time (in seconds).

FIG. 17 shows a 20-term Fourier sine series expansion of the input acceleration history. The first five coefficients of the jib angle history, obtained from integrating the acceleration history, are provided in Table 3. The second and third terms are near the quasi-static frequency of the system, indicating excitation of that frequency.

TABLE 3

First five terms of the Fourier expansion.

| FREQUENCY (HZ) | FOURIER COEFFICIENTS |
| --- | --- |
| $4.424 \times 10^{-1}$ | $1.912 \times 10^{-1}$ |
| $8.849 \times 10^{-1}$ | $8.915 \times 10^{-3}$ |
| 1.327 | $2.784 \times 10^{-3}$ |
| 1.770 | $2.950 \times 10^{-3}$ |
| 2.212 | $6.152 \times 10^{-7}$ |

Finally, some mention of the robustness of the second embodiment is in order. It is expected that the performance of the system will suffer due to inaccuracies of the model. Sensitivity analyses indicate that the most important model parameter is varying load-line length L. Small errors in this quantity can lead to residual vibration, whereas similar errors in jib length can be tolerated without significant degradation of performance. Sensitivity of the response due to the discontinuous nature of the acceleration profile can be reduced by using a smoothed profile such as a versine function.

In summary of the second embodiment, a method and apparatus for generating residual oscillation free maneuvers for a rotary jib crane has been presented. The second embodiment uses the model of the system in conjunction with a numerical optimization process to generate parameters describing the jib angular acceleration profile $\ddot{y}(t)$. Maneuvers obtained using this procedure were experimentally verified demonstrating not only the usefulness of this method but also the ability to accurately simulate such a system. The input profiles were also shown to purposely excite the quasi-static frequencies of payload 130 in order to decrease the operating time of the jib crane, which decreases costs in general.

D. THIRD EMBODIMENT

In this third embodiment (computer controlled without operator-in-the-loop control), a method and apparatus is presented for input command shaping for a rotary jib crane with variable load-line length L is presented. The maneuver of interest is the residual oscillation free, point-to-point movement of payload 130. The input jib angular acceleration $\gamma$ to the jib motor is calculated by two methods. (Again, as in the second embodiment, it is important to note that $\ddot{x}(t)$ and $\ddot{L}(t)$ are also subject to being optimized via the dynamic programming approach presented herein as will become apparent to those skilled in the art; although the discussion regarding jib angular acceleration profile $\ddot{y}(t)$ has been presented for illustration purposes only, similar rationale applies for the other two inputs $\ddot{x}(t)$ and $\ddot{L}(t)$.) The first method uses a dynamic programming algorithm to obtain the optimal angular acceleration $\gamma$ history. The second method uses a parameterized pulse acceleration profile. The initially unknown parameters are determined by solving a constrained optimization problem. The equations of motion and hardware description provided above (prior to the discussion of the first embodiment) apply to this embodiment as well.

Figure 18:
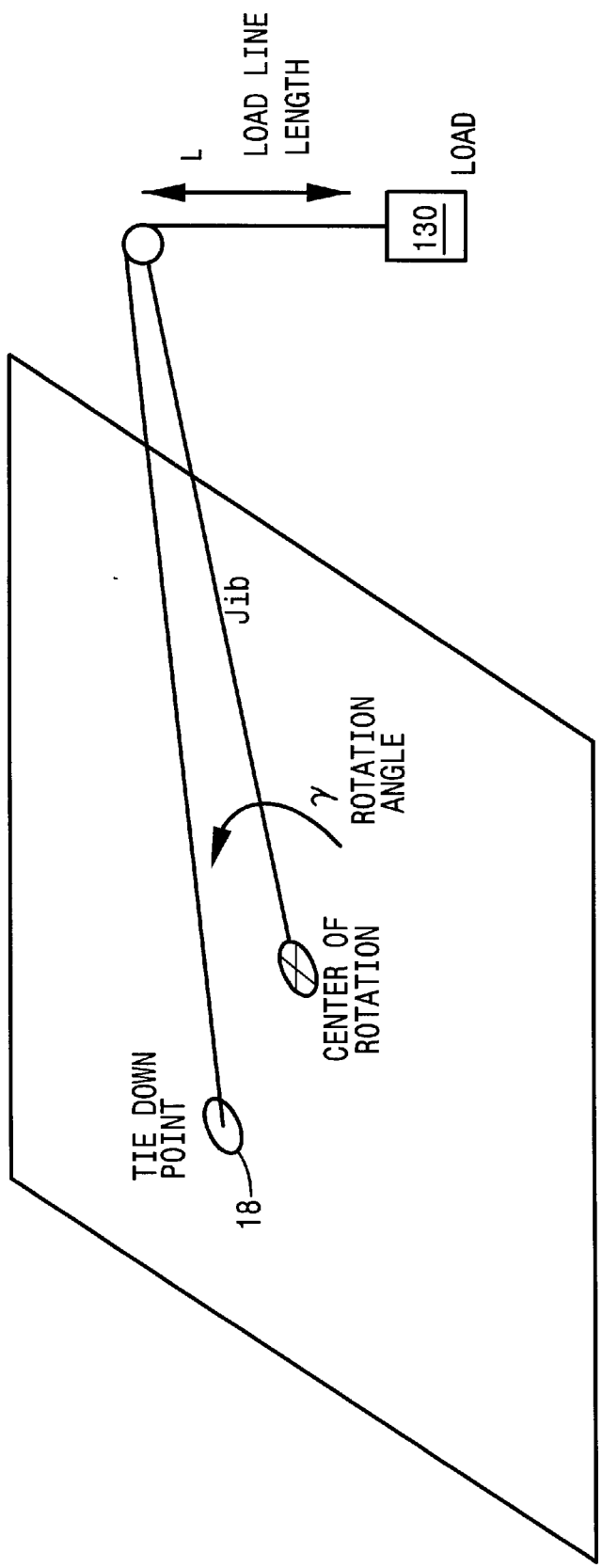
FIG. 18 is a diagram of an experimental setup and Eq. 29 in a third embodiment in accordance with the present invention.

Referring to FIG. 18, as jib 140 rotates, load-line length L changes as a function of jib rotation angle $\gamma$; variable load-line length L was implemented in an experimental apparatus by tying down the end of the load-line 110 at point 18 (for illustration purposes). The load-line length L varies, while trolley position x is fixed, during the maneuver as a function of jib 140 rotation according to Eq. 29:

$$\text{Eq. 29:} \quad L = L_0 - \sqrt{x^2 + c_1^2 + c_2^2 + 2xc_1\cos\gamma + 2xc_2\sin\gamma}$$

where $L_0$ is the nominal load-line length, $c_1$ is the x-coordinate of tiedown point 18 (coordinate system is assumed centered at the center of rotation), $C_2$ is the y-coordinate, x is the jib length, and $\gamma$ is the jib rotation angle.

The values used for $L_0$, $c_1$, and $c_2$ are provided in Table 4 below. For these values, and an exemplary 90° jib rotation, load-line length L has initial and final values of 0.26-m. During the maneuver, load-line length L varies symmetrically, about the 45° position, with a minimum length of 0.23-m.

In the following discussion, a numerical solution for the hub rotation $\gamma(t)$ yielding the residual oscillation-free motion of payload 130, is found by relying on the equations of motion of Eq. 7.

1. Maneuver Generation for Third Embodiment

In this third embodiment, two methods for jib angle $\gamma$ generation are considered. The first method uses a dynamic programming technique where the discretized hub motion is found by minimizing the hub motor effort while simultaneously enforcing the payload oscillation constraints. The second method uses a postulated hub motion which is parameterized by five values. These values are found by solving a parameter optimization problem which minimizes a cost function that penalizes the residual oscillation.

a. Dynamic Programming Approach for Third Embodiment

The dynamic programming optimal control problem for obtaining the hub trajectory is:

Eq. 30: Minimize: $J = \int_0^{t_f} \ddot{y}^2 dt$

Subject to: Eq. 7 (Equations of Motion)

Eq. 31: Constrained by: $\theta(t_f) = \dot{\theta}(t_f) = \phi(t_f) = \dot{\phi}(t_f) = 0$
$\gamma(t_f) = 90°, \dot{\gamma}(t_f) = 0$
$t_f = 2.2$ The implementation of the dynamic programming solution method in this third embodiment utilizes a discretization of the jib angular acceleration $\ddot{y}$ into 100 zero-order hold values, i.e., the input is allowed to change every 0.022 seconds during the maneuver, and the dynamic programming algorithm will return the optimal value for each discretized point.

The dynamic programming method is well suited to input command shaping applications because each iteration requires M order calculations where M is the number of discretizations. In contrast, gradient-based sequential quadratic programming methods require order $M^3$ calculations per iteration.

b. Parameter Optimization Approach for Third Embodiment

The use of this method is motivated by the hardware restrictions, which will vary from hardware to hardware, of requiring constant acceleration commands for the hub. However, this method illustrates that sub-optimal trajectories, in terms of hub motor effort, exist satisfying the primary objective of residual oscillation free motion. Appropriate changes depending upon the hardware will become apparent to those skilled in the art.

The jib angular acceleration profile $\ddot{y}(t)$ is postulated using the pulse-coast-pulse form shown in FIG. 7. The hub motion is uniquely described by the five parameters: $A_1$ the first pulse magnitude, $T_1$ the first pulse duration, $T_2$ the coast duration, $A_2$ the second pulse magnitude, and $T_3$ the second pulse duration.

The parameter optimization problem (parameters in Table 5) for obtaining the hub trajectory $\gamma(t)$ is:

Minimize: $J = \int_{t_f}^{t_f + \Delta} (\phi^2 + \theta^2) dt$   Eq. 32

Subject to: Eq. 7 (Equations of Motion)

$\dot{\theta}(t_f) = \dot{\phi}(t_f) = 0$   Eq. 33
Constrained by: $\gamma(t_f) = 90°, \dot{\gamma}(t_f) = 0$
$t_f$ = free In this case, the cost function is a measure of the residual oscillation of payload 130. A fundamental difference between this approach and the dynamic programming method above is that the final time is free. The quantity $\Delta$ was chosen as 2.0 seconds, to capture residual oscillation in the cost function.

c. Results of Third Embodiment

The experimental system for the third embodiment used a constant acceleration, computer-controlled, direct-drive motor. The physical values used in the experimental apparatus for the third embodiment for trolley position x and mass m of payload 130 are provided in Table 4. The maneuver considered includes of an exemplary 90° jib rotation where at the end of the jib maneuver, payload 130 is oscillation free.

TABLE 4

Physical quantities used for the third embodiment experimental apparatus.

| PARAMETER | UNITS | VALUE |
|---|---|---|
| x | meters | 0.659 |
| m | kilograms | 0.050 |
| $L_0$ | meters | 1.020 |
| $c_1$ | meters | 0.096 |
| $c_2$ | meters | 0.096 |

1. Simulation Results of Third Embodiment

Figure 19:
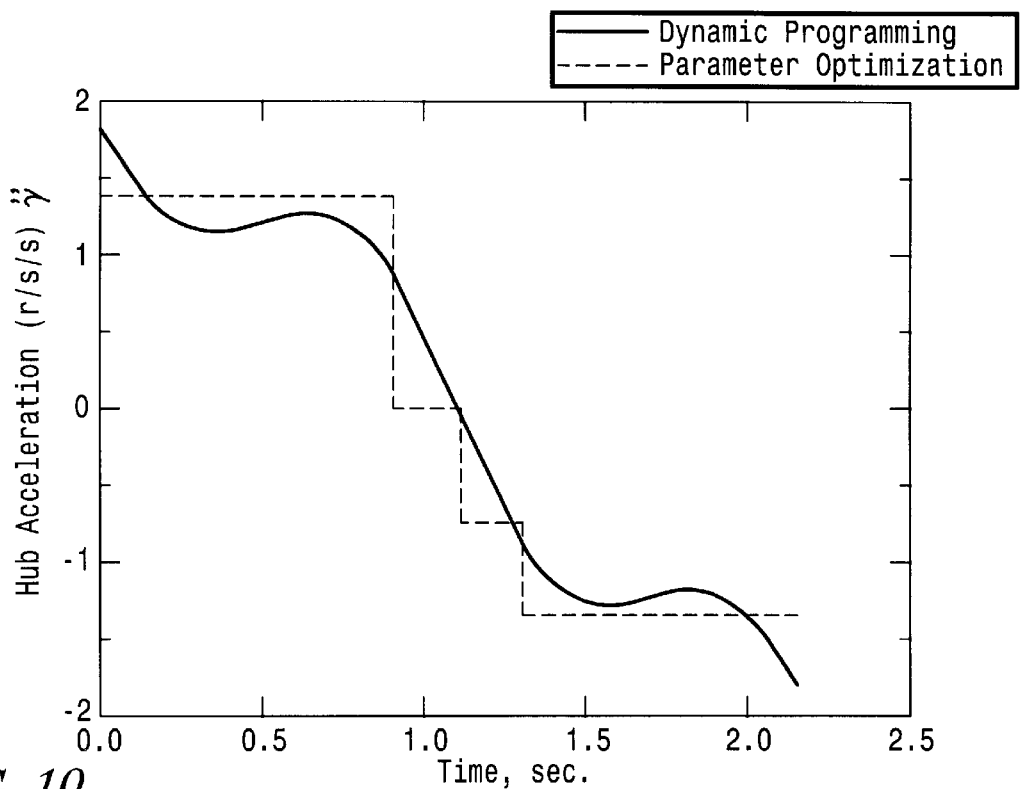
FIG. 19 is a graph of the hub acceleration of a third embodiment in accordance with the present invention with hub acceleration (in radian/sec$^2$) versus time (in seconds) for both dynamic programming and parameter optimization approaches.
Figure 20:
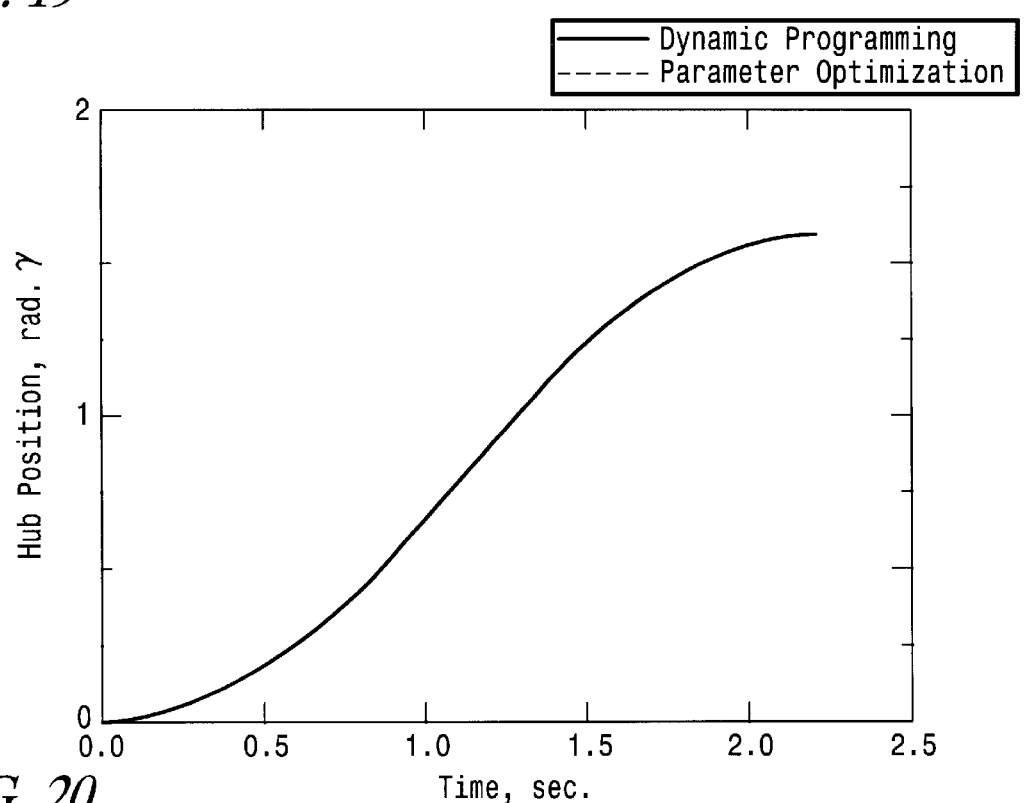
FIG. 20 is a graph of the hub position of a third embodiment in accordance with the present invention with hub position (in radian) versus time (in seconds) for both dynamic programming and parameter optimization approaches.
Figure 21:
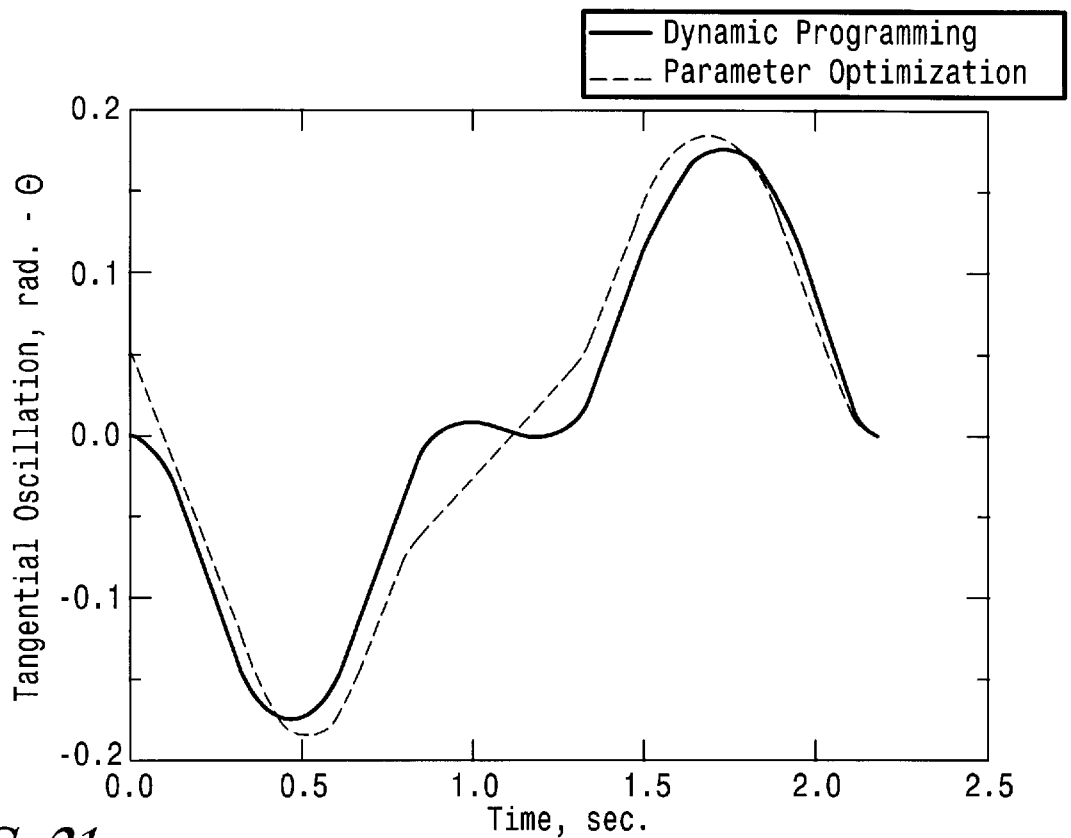
FIG. 21 is a graph of the tangential oscillation of a third embodiment in accordance with the present invention with tangential oscillation (in radian) versus time (in seconds) for both dynamic programming and parameter optimization approaches.
Figure 22:
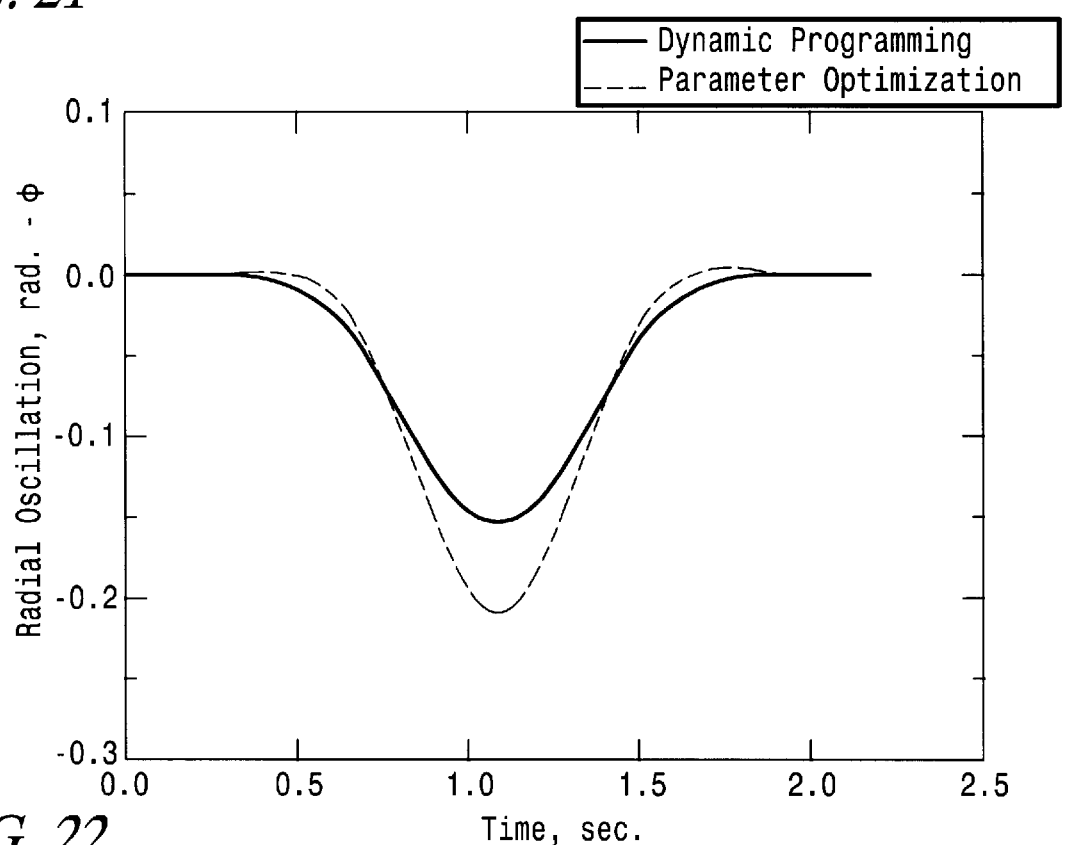
FIG. 22 is a graph of the radial oscillation of a third embodiment in accordance with the present invention with radial oscillation (in radian) versus time (in seconds) for both dynamic programming and parameter optimization approaches.

Using the values of Table 4, the trajectory features for residual oscillation free motion using both dynamic programming and parameter optimization are shown in FIGS. 19 through FIG. 22 (with the dynamic programming results in solid lines, and the parameter optimization results in dotted lines). FIG. 19 is a graph of the hub acceleration of the third embodiment with hub acceleration (in radian/sec/sec) versus time (in seconds). FIG. 20 is a graph of the hub position of the third embodiment with hub position (in radian) versus time (in seconds). FIG. 21 is a graph of the tangential oscillation of the third embodiment with tangential oscillation (in radian) versus time (in seconds). FIG. 22 is a graph of the radial oscillation of the third embodiment with radial oscillation (in radian) versus time (in seconds).

The values for the parameter optimization method are provided in Table 5 using the recursive quadratic programming numerical optimization code developed by Hopper in a manner well known to those skilled in the art [M. J. Hopper, Harwell Subroutine Library, AERE-R9185, UKAEA, Harwell, Oxon., UK (1978)]. The initial estimate for the parameter optimization method was chosen based on an approximation of the dynamic programming solution to a pulse profile. The resulting maneuver completed in 2.1 seconds compared to the dynamic programming maneuver duration of 2.0 seconds.

TABLE 5

Values of Optimal Hub Acceleration Pulse Profile Parameters.

| PARAMETER | UNITS | VALUE |
|---|---|---|
| $A_1$ | r/sec$^2$ | 1.346 |
| $T_1$ | sec | 0.903 |
| $T_2$ | sec | 0.390 |
| $A_2$ | r/sec$^2$ | 1.346 |
| $T_3$ | sec | 0.903 |

2. Experimental Results of Third Embodiment

As mentioned previously, the experimental hardware requires constant acceleration hub commands, excluding the use of the dynamic programming results for verification. The hub trajectory of the parameter optimization results, however, is implemented on the hardware. The resulting motion is observed to be residual oscillation free with no modification to the optimized solution, which implies excellent ability to model and simulate the physical system using Eq. 7. Because of the correlation between the simulated and experimental results, the simulation plots (FIG. 19 through FIG. 22) are used in lieu of measured experimental data for purposes of illustration.

In summary of the third embodiment, a dynamic programming method and apparatus was employed for obtaining the jib angular acceleration history for a variable load-line jib crane producing residual oscillation-free payload motion. It was shown that the jib angular acceleration could also be postulated using a bang-coast-bang shape to achieve the desired residual oscillation free behavior. The parameters of this shape were calculated using the recursive quadratic programming numerical optimization code developed by Hopper [M. J. Hopper, Harwell Subroutine Library, AERE-R9185, UKAEA, Harwell, Oxon., UK (1978)]. The time required for a solution of this gradient-based approach was dependent on the quality of the initial estimate. When the estimate was based on an approximation to the results of the dynamic programming approach, the time required for solution was approximately the same as the dynamic programming method. It should be noted, however, that the dynamic programming method requires no initial estimate (a solution is found without an initial estimate required, whereas the optimization approach requires an initial estimate). This feature is particularly useful for systems with time-varying or nonlinear equations of motion where physical insight into the solution is elusive.

The parameter optimization results were verified experimentally using constant acceleration commands to the hub motor. The resulting residual oscillation free motion of the payload was achieved with no "tuning" of the crane simulation indicating the ability to accurately model the system.

The notion of providing input commands to a rotary-style crane based on a set of nonlinear coupled equations of motion has been demonstrated above in at least three embodiments subject to certain constraints. The swing-free operator control system and method described herein controls residual oscillation of suspended payloads on rotary-style cranes, which exhibit a multiple (at least two) degree-of-freedom sway. Gantry-style cranes exhibit a one degree-of-freedom sway (one direction). Furthermore, the equations of motion for the rotary-style crane are non-linear and coupled. The present invention discloses configuration-dependent and coupled filters for the rotary-style crane. Additionally, the present invention provides computer-controlled (without operator involvement) maneuvers that result in residual oscillation-free payload motion.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention can involve components having different characteristics as long as the principle, the presentation of a method and apparatus for filtering the rotary crane input commands and for generating maneuvers based on nonlinear coupled equations of motion, is followed. It is intended that the scope of the present invention be defined by the claims appended hereto.

We claim:

1. A system for filtering crane input signals such that payload sway is damped, the rotary crane having a rotary jib, the rotary jib being rotatable in the horizontal plane, a trolley attached to the rotary jib, the trolley being moveable in a horizontal plane and being controlled by a crane controller, a payload suspended by a variable-length load-line from the trolley, the payload being moveable in the horizontal and a vertical plane by an operator via at least one operator input device, the payload experiencing a sway characterized by a tangential rotation angle $\theta(t)$ and a radial rotation angle $\phi(t)$, the system being characterized by multiple oscillatory degrees of freedom for the radial rotation angle and the tangential rotation angle, the system comprising:

input signal receiving means for receiving input signals from the operator input device, the input signals comprising a jib angular velocity $\dot{\gamma}$ and a trolley velocity $\dot{x}$;

input-shaping filter means for converting the input signals into output signals readable by the crane controller, the output signals comprising a filtered jib angular velocity $\dot{\gamma}_F$ and a filtered trolley velocity $\dot{x}_F$ such that the tangential rotation angle $\theta(t)$ and the radial rotation angle $\phi(t)$ approach zero; and output signal transmitting means for transmitting the output signals to the crane controller to dampen the payload sway associated with movement of the rotary jib.

2. The system of claim 1, wherein the input-shaping filter means is computer implemented.

3. The system of claim 2, wherein the multiple oscillatory degrees of freedom for the radial rotation angle $\phi$ and the tangential rotation angle $\theta$ are determined by a plurality of equations of nonlinear and coupled equations of motion, the plurality of equations being a function of the load-line length L, gravity g, trolley position x, the jib rotation angle $\gamma$, the radial rotation angle $\phi$, and the tangential rotation angle $\theta$.

4. The system of claim 3, wherein the plurality of equations have a form of:

$$\begin{bmatrix}\ddot{\phi}\\\ddot{\theta}\end{bmatrix}+2\begin{bmatrix}\frac{\dot{L}}{L} & \dot{\gamma}\\-\dot{\gamma} & \frac{\dot{L}}{L}\end{bmatrix}\begin{bmatrix}\dot{\phi}\\\dot{\theta}\end{bmatrix}+\begin{bmatrix}\left(\frac{g}{L}-\dot{\gamma}^2\right) & \left(\ddot{\gamma}+2\dot{\gamma}\frac{\dot{L}}{L}\right)\\-\left(\ddot{\gamma}+2\dot{\gamma}\frac{\dot{L}}{L}\right) & \left(\frac{g}{L}-\dot{\gamma}^2\right)\end{bmatrix}\begin{bmatrix}\phi\\\theta\end{bmatrix}=$$

$$\frac{1}{L}\begin{bmatrix}\ddot{x}-\dot{\gamma}^2 x\\-\ddot{\gamma}x-2\dot{x}\dot{\gamma}\end{bmatrix},\text{ where L}$$

is the load-line length, g is gravity, x is the position of the trolley, $\gamma$ is the jib rotation angle, $\phi$ is the radial rotation angle, and $\theta$ is the tangential rotation angle.

5. The system of claim 3, wherein the plurality of equations have a form of:

$$\begin{bmatrix}\ddot{\phi}\\\ddot{\theta}\end{bmatrix}+\begin{bmatrix}\frac{g}{L} & \ddot{\gamma}\\-\ddot{\gamma} & \frac{g}{L}\end{bmatrix}\begin{bmatrix}\phi\\\theta\end{bmatrix}=\frac{1}{L}\begin{bmatrix}\ddot{x}\\-x\ddot{\gamma}\end{bmatrix},$$

where L is the load-line length, g is gravity, x is the position of the trolley, $\gamma$ is the jib rotation angle, $\phi$ is the radial rotation angle, and $\theta$ is the tangential rotation angle.

6. The system of claim 4, wherein the input-shaping filter means is a function of the plurality of equations.

7. The system of claim 6, wherein the input-shaping filter means comprises a first filter for jib angular velocity $\dot{\gamma}$ and a second filter for trolley velocity $\dot{x}$.

8. The system of claim 7, wherein the first filter and second filter are a function of trolley position x, trolley acceleration $\ddot{x}$, and jib angular acceleration $\ddot{\gamma}$.

9. The system of claim 8, wherein the first filter and second filter are a function of load-line length L and gravity g.

10. The system of claim 9, wherein:
the first filter is defined by the integral of a Laplace-domain quantity having a form of:

$$\ddot{x}_F = \frac{a^3\beta\left(s^2 + \frac{1}{\beta}\right)}{(s+a)^3}[\ddot{x}] + \frac{\Gamma a^3 s^2}{(s+a)^3}[x\ddot{y}];$$

and
the second filter is defined by the integral of a Laplace-domain quantity having a form of:

$$\ddot{y}_F = \frac{(\Gamma a^3 s^2)}{(s+a)^3}[\ddot{x}] - \frac{a^3\beta\left(s^2 + \frac{1}{\beta}\right)}{x(s+a)^3}[x\ddot{y}],$$

where a is a predetermined design constant, $\beta$ is a function of gravity g and load-line length L, x is trolley position, $\ddot{x}$ is trolley acceleration, and $\ddot{y}$ is jib angular acceleration.

11. The system of claim 9, wherein:
the first filter is decoupled and is defined by the integral of a Laplace-domain quantity having a form of:

$$\ddot{x}_F = \frac{a^3 \frac{L}{g}\left(s^2 + \frac{g}{L}\right)}{(s+a)^3}[\ddot{x}]$$

the second filter is decoupled and is defined by the integral of a Laplace-domain quantity having a form of:

$$\ddot{y}_F = \frac{a^3 \frac{L}{g}\left(s^2 + \frac{g}{L}\right)}{(s+a)^3}[\ddot{y}]$$

where a is a predetermined design constant, $\beta$ is a function of gravity g and load-line length L, x is trolley position, $\ddot{x}$ is trolley acceleration, and $\ddot{y}$ is jib angular acceleration.

12. The system of claim 10, wherein the first filter and second filter are adapted to yield unity steady-state gain.

13. The system of claim 10, further comprising means for providing a load-line length velocity $\dot{L}$ signal to the crane controller.

14. The system of claim 13, further comprising means for updating said first and second filters with trolley position x and load-line length L in real-time.

15. The system of claim 2, further comprising visual means for providing real-time graphical output to the operator for training purposes and operator input responsive to the graphical output.

16. A computer-implemented method for filtering rotary crane input signals such that payload sway is damped, the rotary crane having a rotary jib, the rotary jib being rotatable in the horizontal plane, a trolley attached to the rotary jib, the trolley being moveable in a horizontal plane and being controlled by a crane controller, a payload suspended by a variable-length load-line from the trolley, the payload being moveable in the horizontal and a vertical plane by an operator via at least one operator input device, the payload experiencing a sway characterized by a tangential rotation angle $\theta(t)$ and a radial rotation angle $\phi(t)$, the system being characterized by multiple oscillatory degrees of freedom for the radial rotation angle and the tangential rotation angle, the method comprising the steps of:

representing the dynamics of the rotary crane with a plurality of equations of nonlinear and coupled equations of motion, the plurality of equations being a function of the load-line length L, gravity g, trolley position x, the jib rotation angle $\gamma$, the radial rotation angle $\phi$, and the tangential rotation angle $\theta$;

implementing command-shaping filters based on the plurality of equations;

receiving input signals from at least one operator input device;

filtering the input signals to produce filtered input signals;

transmitting the filtered input signals to the crane controller such that payload sway associated with movement of the rotary jib is dampened.

17. The method of claim 16, further comprising the steps of:

linearizing the plurality of equations with respect to the radial rotation angle $\phi$ and the tangential rotation angle $\theta$;

transforming the linearized plurality of equations to modal coordinates;

designing and implementing command-shaping filters;

transforming the command-shaping filters to a physical coordinate system to obtain filtered inputs;

providing the filtered input signals to the crane controller.

18. A computer-implemented system for generating rotary-crane maneuvers such that payload sway is damped, the rotary crane having a rotary jib, the rotary jib being rotatable in the horizontal plane, a trolley attached to the rotary jib, the trolley being moveable in a horizontal plane and being controlled by a crane controller, a payload suspended by a variable-length load-line from the trolley, the payload being moveable in the horizontal and a vertical plane by commands from the computer-implemented system, the payload experiencing a sway characterized by a tangential rotation angle $\theta(t)$ and a radial rotation angle $\phi(t)$, the system being characterized by multiple oscillatory degrees of freedom for the radial rotation angle and the tangential rotation angle, the system comprising:

maneuver generation means for providing input signals readable by the crane controller, the input signals being characterized by predetermined initial and final positions of the payload, the initial positions being a function of a trolley position x, a jib rotation angle $\gamma$, and a load-line length L; and output signal transmitting means for transmitting the output signals to the crane controller to control a series of predetermined paths of the payload in such a way that sway associated with movement of the rotary jib is damped.

19. The system of claim 18, wherein the multiple oscillatory degrees of freedom for the radial rotation angle $\phi$ and the tangential rotation angle $\theta$ are determined by a plurality of equations of nonlinear and coupled equations of motion, the plurality of equations being a function of the load-line length L, gravity g, trolley position x, the jib rotation angle $\gamma$, the radial rotation angle $\phi$, and the tangential rotation angle $\theta$.

20. The system of claim 19, wherein the plurality of equations have a form of:

$$\begin{bmatrix} \ddot{\phi} \\ \ddot{\theta} \end{bmatrix} + 2 \begin{bmatrix} \frac{\dot{L}}{L} & \dot{\gamma} \\ -\dot{\gamma} & \frac{\dot{L}}{L} \end{bmatrix} \begin{bmatrix} \dot{\phi} \\ \dot{\theta} \end{bmatrix} + \begin{bmatrix} \left(\frac{g}{L} - \dot{\gamma}^2\right) & \left(\ddot{\gamma} + 2\dot{\gamma}\frac{\dot{L}}{L}\right) \\ -\left(\ddot{\gamma} + 2\dot{\gamma}\frac{\dot{L}}{L}\right) & \left(\frac{g}{L} - \dot{\gamma}^2\right) \end{bmatrix} \begin{bmatrix} \phi \\ \theta \end{bmatrix} =$$

$$\frac{1}{L} \begin{bmatrix} \ddot{x} - \dot{\gamma}^2 x \\ -\ddot{\gamma} x - 2\dot{x}\dot{\gamma} \end{bmatrix},$$

wherein L is the load-line length, g is gravity, x is the position of the trolley, $\gamma$ is the jib rotation angle, $\phi$ is the radial rotation angle, and $\theta$ is the tangential rotation angle.

21. The system of claim 20, wherein the maneuver generation means comprises means for generating a parameterized jib angular acceleration profile, a parameterized trolley acceleration profile, and a parameterized load-line velocity profile.

22. The system of claim 21, wherein the maneuver generation means comprises a predetermined asymmetrical pulse form, the pulse form comprising a first pulse magnitude $A_1$, a first pulse duration $T_1$, a coast duration $T_2$, a second pulse magnitude $A_2$, and a second pulse duration $T_3$.

23. The system of claim 22, wherein the second pulse magnitude $A_2$ determines a final position of the payload.

24. The system of claim 23, wherein the second pulse magnitude $A_2$ is determined by $$A_2 = \frac{A_1 T_1}{T_3}.$$

25. The system of claim 24, wherein the second pulse magnitude $A_2$ is optimized to obtain a residual oscillation-free motion of the payload.

26. The system of claim 25, wherein the second pulse magnitude $A_2$ is optimized by applying recursive quadratic programming.

27. The system of claim 25, further comprising:

integration means for integrating the plurality of equations; and means for evaluating a cost function of the form $$J = w_1 \theta^2(t_f) + w_2 \dot{\theta}^2(t_f) + w_3 \phi^2(t_f) + w_4 \dot{\phi}^2(t_f),$$

where $w_i$ are weighting coefficients and are selected such that residual oscillation of the payload is minimized.

28. The system of claim 20, wherein the maneuver generation means comprises means for generating a parameterized jib angular acceleration profile, a parameterized trolley acceleration profile, and a parameterized load-line velocity profile.

29. The system of claim 28, wherein the parameterized jib angular acceleration profile, the parameterized trolley acceleration profile, and the parameterized load-line velocity profile are optimized by dynamic programming to obtain a residual oscillation-free motion of the payload.

30. The system of claim 28, wherein the load-line length is defined by:

$L = L_o - \sqrt{x_2 + c_1^2 + c_2^2 + 2xc_1 \cos\gamma + 2xc_2 \sin\gamma}$, where $L_o$ is a nominal load-line length, $c_1$ is a x-coordinate of the trolley, $c_2$ is a y-coordinate of the trolley, x is the jib length, and $\gamma$ is the jib rotation angle.

* * * * *